United States Patent [19]
Chaudhuri et al.

[11] Patent Number: 5,913,206
[45] Date of Patent: Jun. 15, 1999

[54] DATABASE SYSTEM MULTI-COLUMN INDEX SELECTION FOR A WORKLOAD

[75] Inventors: Surajit Chaudhuri, Redmond; Vivek Narasayya, Bellevue, both of Wash.

[73] Assignee: Microsoft Corporation, Redmond, Wash.

[21] Appl. No.: 08/980,831

[22] Filed: Dec. 1, 1997

Related U.S. Application Data

[63] Continuation-in-part of application No. 08/912,036, Aug. 15, 1997.
[51] Int. Cl.$^6$ ........................................... G06F 17/30
[52] U.S. Cl. .................... 707/2; 707/1; 707/3; 707/5; 707/101; 707/205
[58] Field of Search .................... 707/1, 2, 3, 5, 707/101, 205; 702/186; 340/825, 35; 348/286; 385/102; 156/256

[56] References Cited

U.S. PATENT DOCUMENTS

| | | | |
|---|---|---|---|
| 5,544,355 | 8/1996 | Chaudhuri | 707/2 |
| 5,598,559 | 1/1997 | Chaudhuri | 707/2 |
| 5,644,763 | 7/1997 | Roy | 707/101 |
| 5,806,057 | 9/1998 | Gormley | 707/1 |
| 5,822,749 | 10/1998 | Agarwal | 707/2 |

OTHER PUBLICATIONS

Caprara, Alberto, et al., "Exact and Approximate Algorithms for the Index Selection Problem in Physical Database Design," *IEEE Transactions on Knowledge and Data Engineering*, vol. 7, No. 6, pp. 955–967 (Dec. 1995).

Chaudhuri, Surajit, et al., "An Efficient, Cost–Driven Index Selection Tool for Microsoft SQL Server," *Proceedings of the 23rd International Conference on Very Large Data Bases (VLDB)*, Athens, Greece, pp. 146–155 (Aug. 25–29, 1997).

Choenni, Sunil, et al., "A Framework for a Tool for Physical Database Design," *Proceedings of Computing Science in the Netherlands*, pp. 96–107 (1992).

Choenni, Sunil, et al., "On the Automation of Physical Database Design," *Proceedings of the ACM Symposium on Applied Computing (SAC)*, pp. 358–367 (Feb. 1993).

Choenni, Sunil, et al., "Index Selection in Relational Databases," *Proceedings of the Fifth International Conference on Computing and Information (ICCI)*, IEEE Computer Society, Sudbury, Ontario, Canada, pp. 491–496 (May 27–29, 1993).

Choenni, Sunil, et al., "On the Selection of Secondary Indices in Relational Databases," *Data & Knowledge Engineering*, 11, pp. 207–233 (1993).

Corrigan, Peter, et al., *ORACLE Performance Tuning*, O'Reilly & Associates, Inc., pp. 81–86 (1993).

Finkelstein, S., et al., "Physical Database Design for Relational Databases," *ACM Transactions on Database Systems (TODS)*, vol. 13, No. 1, pp. 91–128 (Mar. 1988).

Frank, Martin R., et al., "Adaptive and Automated Index Selection in RDBMS," *Advances in Database Technology, Proceedings of the Third International Conference on Extending Database Technology (EDBT)*, Vienna, Austria, pp. 277–292 (Mar. 23–27, 1992).

Gupta, Himanshu, et al., "Index Selection for OLAP," *Proceedings of ICDE*, 20 pages (Apr. 7–11, 1997).

(List continued on next page.)

*Primary Examiner*—Thomas G. Black
*Assistant Examiner*—Diane D. Mizrahi
*Attorney, Agent, or Firm*—Watts, Hoffmann, Fisher & Heinke, Co., L.P.A.

[57] ABSTRACT

An index selection tool helps reduce costs in time and memory in selecting an index configuration or set of indexes for use by a database server in accessing a database in accordance with a workload of queries. The index selection tool attempts to reduce the number of indexes to be considered, the number of index configurations to be enumerated, and the number of invocations of a query optimizer in selecting an index configuration for the workload.

29 Claims, 9 Drawing Sheets

OTHER PUBLICATIONS

Hammer, Michael, et al., "Index Selection in a Self–Adaptive Data Base Management System," *Proceedings of the ACM SIGMOD Conference,* Washington, D.C., pp. 93–101 (Jun. 1976).

Harinarayan, Venky, et al., "Implementing Data Cubes Efficiently," *Proceedings of the ACM SIGMOD Conference,* pp. 205–216 (1996).

Hobbs, Lilian, et al., *Rdb/VMS: A Comprehensive Guide,* Digital Press, pp. vii–x and 289–298 (1991).

Labio, Wilburt Juan, et al., "Physical Database Design for Data Warehouses," *Proceedings of ICDE,* 30 pages (Apr. 7–11, 1997).

Olken, Frank, et al., "Simple Random Sampling from Relational Databases," *Proceedings of the Twelfth International Conference on Very Large Data Bases (VLDB),* Kyoto, pp. 160–169 (Aug. 1986).

Olken, Frank, et al., "Random Sampling from Databases—A Survey," Information and Computing Sciences Div., Lawrence Berkeley Laboratory, Berkeley, California, pp. 1–55 (Mar. 1994).

Ross, Kenneth A., et al., "Materialized View Maintenance and Integrity Constraint Checking: Trading Space for Time," *Proceedings of the ACM SIGMOD Conference,* pp. 447–458 (Apr. 1996).

Rozen, Steve, et al., "A Framework for Automating Physical Database Design," *Proceedings of the Seventeenth International Conference on Very Large Data Bases (VLDB),* Barcelona, Spain, pp. 401–411 (Sep. 1991).

Stonebraker, Michael, "Hypothetical Data Bases as Views," *Proceedings of the ACM SIGMOD Conference,* pp. 224–229 (1981).

DATABASE SYSTEM MULTI-COLUMN INDEX SELECTION FOR A WORKLOAD

This patent application is a continuation-in-part application of pending U.S. application Ser. No. 08/912,036, filed Aug. 15, 1997. U.S. application Ser. No. 08/912,036 is herein incorporated by reference.

FIELD OF THE INVENTION

The present invention relates generally to the field of database systems. More particularly, the present invention relates to the field of index selection for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. To enhance performance in processing queries, database servers use indexes to help access data in a database more efficiently. Although all possible indexes for a database can be constructed, the number of possible indexes over a database can be very large and can significantly increase the memory requirements, including storage requirements, for the database. Also, many of the possible indexes may provide no or minimal performance advantage considering the data in the database, the organization of the data in the database, and the usage of the database as represented by a workload of queries executed against the database. Typical database systems therefore use only a subset of possible indexes for accessing databases.

A physical database design tool or database administrator typically selects an index configuration or set of indexes for use by a database system from among possible combinations of indexes for a database. The effectiveness of any index configuration depends, for example, on the data in the database, on the query optimizer accessing the database, and on the workload of queries to be executed against the database. As a database system evolves through database updates and modifications and through changes in workloads of queries, for example, new index configurations should be considered and selected to help maintain a desired level of performance of the database system.

One typical design tool selects index configurations based on semantic information such as uniqueness, reference constraints, and rudimentary statistics such is small versus big tables for example. As this design tool fails to account for query workloads, however, the effectiveness of the selected index configuration is limited.

Another typical design tool uses a knowledge-based or rules-based approach and accounts for query workloads in selecting index configurations. As this design tool uses its own model of index usage by database query optimizers, however, the effectiveness of the selected index configuration is limited by inaccuracies of the model. Furthermore, constructing a model and maintaining a level of consistency between the model and the evolving query optimizer can be very complex and can incur substantial cost in time and memory.

To avoid asynchrony between the design tool and the query optimizer, other design tools use cost estimates determined by the query optimizer to compare the effectiveness of different index configurations. Such design tools are desirable as they account for both query workloads and index usage by query optimizers. Because the space of possible indexes over a database can be very large, however, searching among such indexes can incur substantial cost in time and memory. The problem of selecting an index configuration can be further compounded by the presence of multi-column indexes.

SUMMARY OF THE INVENTION

A method selects an index configuration from a set of indexes based on a workload of queries to be executed against a database. The method may be implemented with computer-executable instructions of a computer readable medium.

For the method, an index configuration comprising indexes each on at most a predetermined number i column(s) is selected from the set of indexes based on the workload of queries. The predetermined number i may be one. Estimated costs to execute queries of the workload for index configurations comprising indexes each on at most the predetermined number i column(s) from the set of indexes may be determined. One of the index configurations comprising indexes each on at most the predetermined number i column (s) may be selected based on the determined estimated costs.

A set of candidate indexes may be determined from the set of indexes. The index configuration comprising indexes each on at most the predetermined number i column(s) may be selected from the set of candidate indexes based on the workload of queries.

An index configuration comprising indexes each on at most one additional column is repeatedly selected from the set of indexes based on a previously selected index configuration and based on the workload of queries until an index configuration of indexes each on at most a predetermined number n columns is selected.

A set of multi-column indexes each on one additional column may be generated based on the previously selected index configuration. The set of multi-column indexes may be generated such that each multi-column index of the generated set has as one or more leading columns the column(s) from one of the indexes of the previously selected index configuration. The set of multi-column indexes may also be generated such that each multi-column index of the generated set has as a trailing column an indexable column for the workload, one of the column(s) from one of the indexes of the previously selected index configuration, a part of a projection list in the workload, or a required column for a query of the workload with respect to a table of the database having the leading column(s) of the multi-column index.

The index configuration comprising indexes each on at most one additional column may be selected from the indexes of the previously selected index configuration and from the generated set of multi-column indexes based on the workload of queries. Estimated costs to execute queries of the workload for index configurations comprising indexes from the previously selected index configuration and from the generated set of multi-column indexes may be determined. One of the index configurations comprising indexes from the previously selected index configuration and from the generated set of multi-column indexes may be selected based on the determined estimated costs.

An index configuration also comprising one or more indexes each on at most one additional column may be selected from the set of indexes based on one or more required columns for a query of the workload with respect to a table of the database.

A set of candidate indexes may be determined from the indexes of the previously selected index configuration and from the generated set of multi-column indexes. The index configuration comprising indexes each on at most one additional column may be selected from the set of candidate indexes based on the workload of queries.

The same index configuration enumeration tool may be used to select the index configuration comprising indexes each on at most the predetermined number i column(s) and to select the index configuration comprising indexes each on at most one additional column.

An index configuration for use by a database server to execute queries of the workload against the database may be determined as the selected index configuration of indexes each on at most the predetermined number n columns.

Another method selects an index configuration from an initial working set of indexes based on a workload of queries to be executed against a database. The method may be implemented with computer-executable instructions of a computer readable medium.

For the method, an index configuration comprising indexes each on at most i column(s) is selected based on the workload of queries from the working set of indexes. The variable i may initially be one.

Estimated costs to execute queries of the workload for index configurations comprising indexes each on at most i column(s) from the working set of indexes may be determined. One of the index configurations comprising indexes each on at most i column(s) may be selected based on the determined estimated costs.

A set of candidate indexes may be determined from the working set of indexes. The index configuration comprising indexes each on at most i column(s) may be selected from the set of candidate indexes based on the workload of queries.

A new working set of indexes is determined as comprising the indexes of the selected index configuration and comprising any (i+1)-column indexes having as one or more leading columns the column(s) from one of the indexes of the selected index configuration. The variable i is incremented and the selection of an index configuration from the working set of indexes and the determination of the new working set of indexes are repeated until an index configuration of indexes each on at most a predetermined number n columns is selected.

Each (i+1)-column index of the determined new working set of indexes may have as a trailing column an indexable column for the workload, one of the column(s) from one of the indexes of the selected index configuration, a part of a projection list in the workload, or a required column for a query of the workload with respect to a table of the database having the leading column(s) of the (i+1)-column index.

The new working set of indexes may be determined as also comprising any (i+1)-column indexes each on one or more required columns for a query of the workload with respect to a table of the database.

An index configuration for use by a database server to execute queries of the workload against the database may be determined as the selected index configuration of indexes each on at most the predetermined number n columns.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The subject matter of this patent application is disclosed in a conference paper, Surajit Chaudhuri and Vivek Narasayya, "An Efficient, Cost-Driven Index Selection Tool for Microsoft SQL Server," *Proceedings of the 23rd International Conference on Very Large DataBases* (VLDB), Athens, Greece, pp. 146–155 (Aug. 25–29, 1997). This paper is herein incorporated by reference.

An index selection tool in accordance with the present invention helps reduce costs in time and memory in selecting an index configuration or set of indexe for use by a database server in accessing a database in accordance with a workload of queries.

Exemplary Operating Environment

Figure 1:
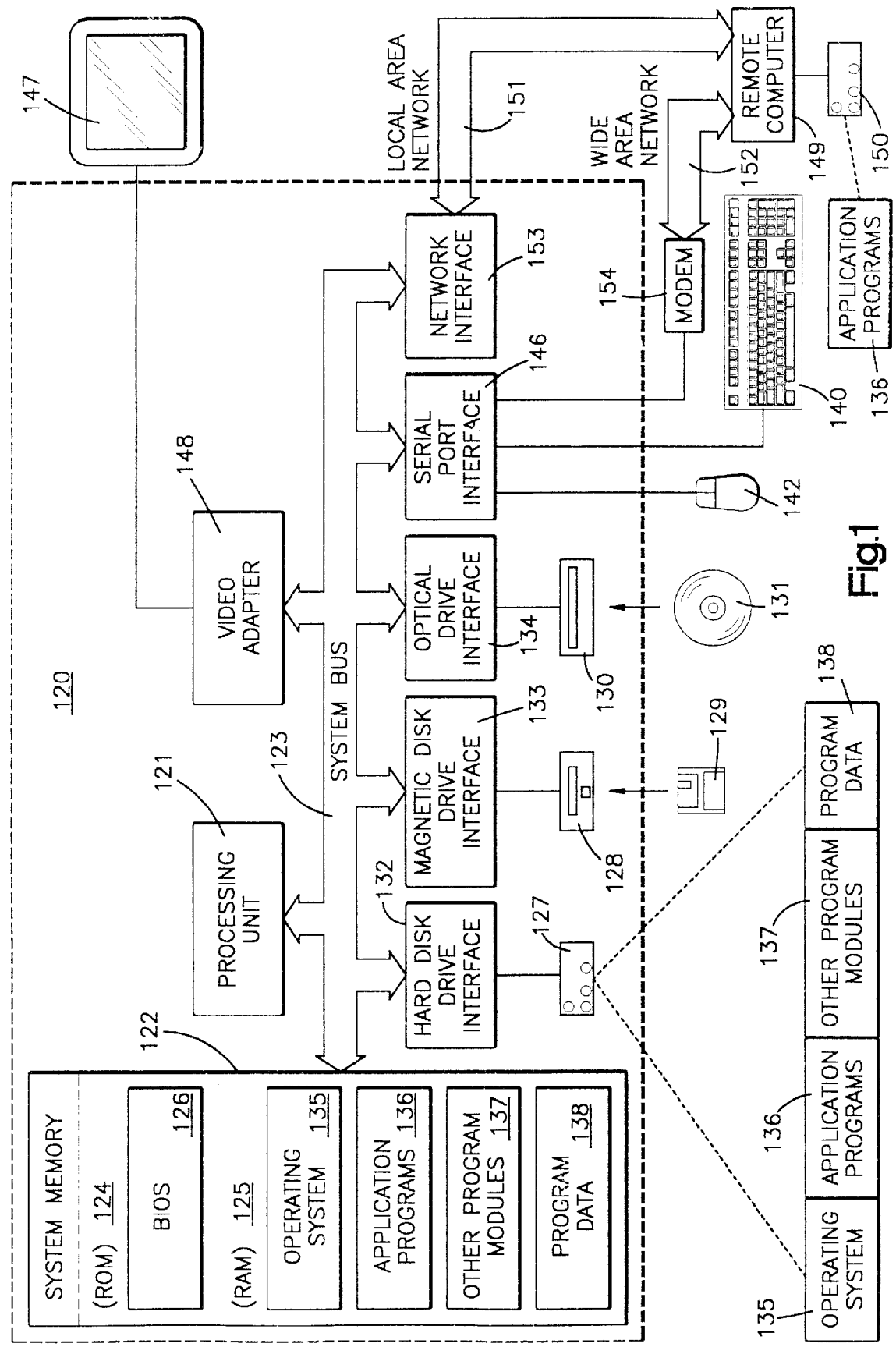
FIG. 1 illustrates an exemplary operating environment for selecting an index configuration or set of indexes for a database system.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, dita structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices, such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, personal computer 120 is connected to local network 151 through a network interface or adapter 153. When used in a WAN networking environment, personal computer 120 typically includes a modem 154 or other means for establishing communications over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Database System

Figure 2:
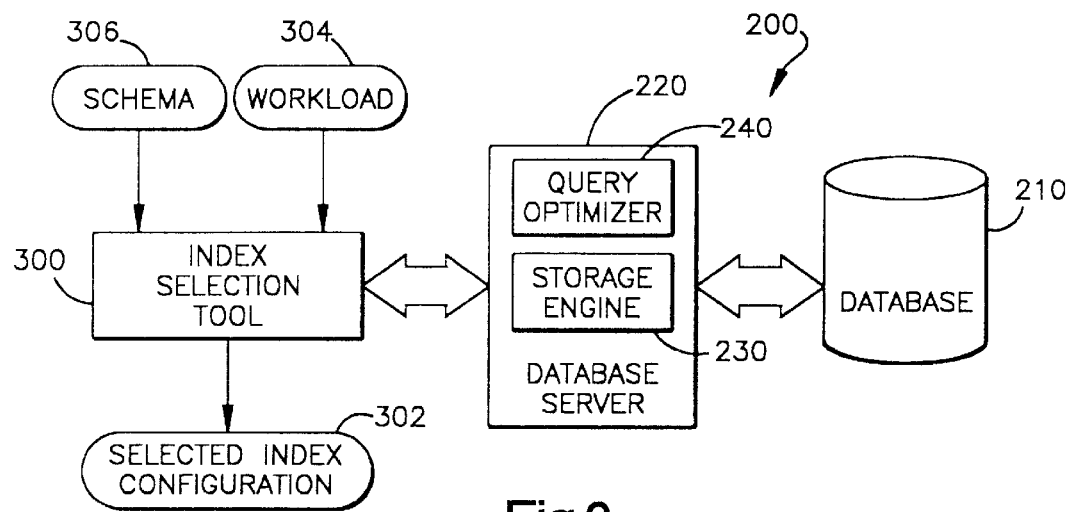
FIG. 2 illustrates, for one embodiment, a database system comprising an index selection tool, a database server, and a database.

FIG. 2 illustrates for one embodiment a computer database System 200 comprising a database 210, a database server 220, and an index selection tool 300. Database system 200 manages the storage and retrieval of data in database 210 in accordance with data manipulation statements or queries presented to database system 200 by a database application or by a user, for example.

Database 210 comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database 210. Database system 200 may support any suitable query language, such as Structured Query Language (SQL) for example, to define the queries that may be processed by database server 220. Suitable SQL queries include, for example, Select, Insert, Delete, and Update.

Database server 220 comprises a storage engine 230 for accessing data in database 210. To enhance performance in processing queries, database server 220 also comprises a query optimizer 240 that uses indexes of a selected index configuration 302 to help access data in database 210 more efficiently. An index configuration is a set of indexes. An index may be single-column or multi-column and may be clustered or non-clustered. For one embodiment, query optimizer 240 may use at most one clustered index over any single table of database 210. The possible indexes that may be included in selected index configuration 302 depends, for example, on the data of database 210.

Index selection tool 300 selects index configuration 302 for use by database server 220 from among possible or candidate index configurations in accordance with a workload 304, a database schema 306, and query optimizer 240 of database server 220. Workload 304 comprises a set of queries to be executed against database 210. For embodiments supporting SQL queries, workload 304 may be generated using SQLTrace utility, for example Database schema 306 comprises statistical information on tables of database 210 and on indexes for accessing database 210. Index selection tool 300 for one embodiment may gather information for database schema 306 from database server 220 on startup.

Given the data of database 210 and the queries of workload 304, index selection tool 300 attempts to select an effective set of indexes for index configuration 302 to help minimize the cost of executing workload 304 against database 210. Index selection tool 300 selects index configuration 302 based on the relative effectiveness among candidate index configurations for database 210. The effectiveness of a given index configuration for one embodiment is based on cost estimates as determined by query optimizer 240 to execute queries of workload 304 against database 210 using the index configuration.

As one measure of effectiveness, index selection tool 300 may determine the total cost of an index configuration as the sum of the cost estimates by query optimizer 240 to execute each query of workload 304 against database 210 using the index configuration. The candidate index configuration having the least total cost is considered the most effective in minimizing the cost of executing workload 304 against database 210 and is referred to as an optimal index configuration.

Because the number of indexes and therefore index configurations over database 210 can be very large, the selection of index configuration 302 by index selection tool 300 can incur a significant cost in time and memory. This cost depends, for example, on the number of indexes considered by index selection tool 300 for workload 304, the number of index configurations enumerated by index selection tool 300, and the number of invocations of query optimizer 240 by index selection tool 300 to determine the total cost for each index configuration. Index selection tool 300 attempts to select an index configuration that is optimal or near-optimal while minimizing the cost in searching the index configurations.

Index Selection Tool

Figure 3:
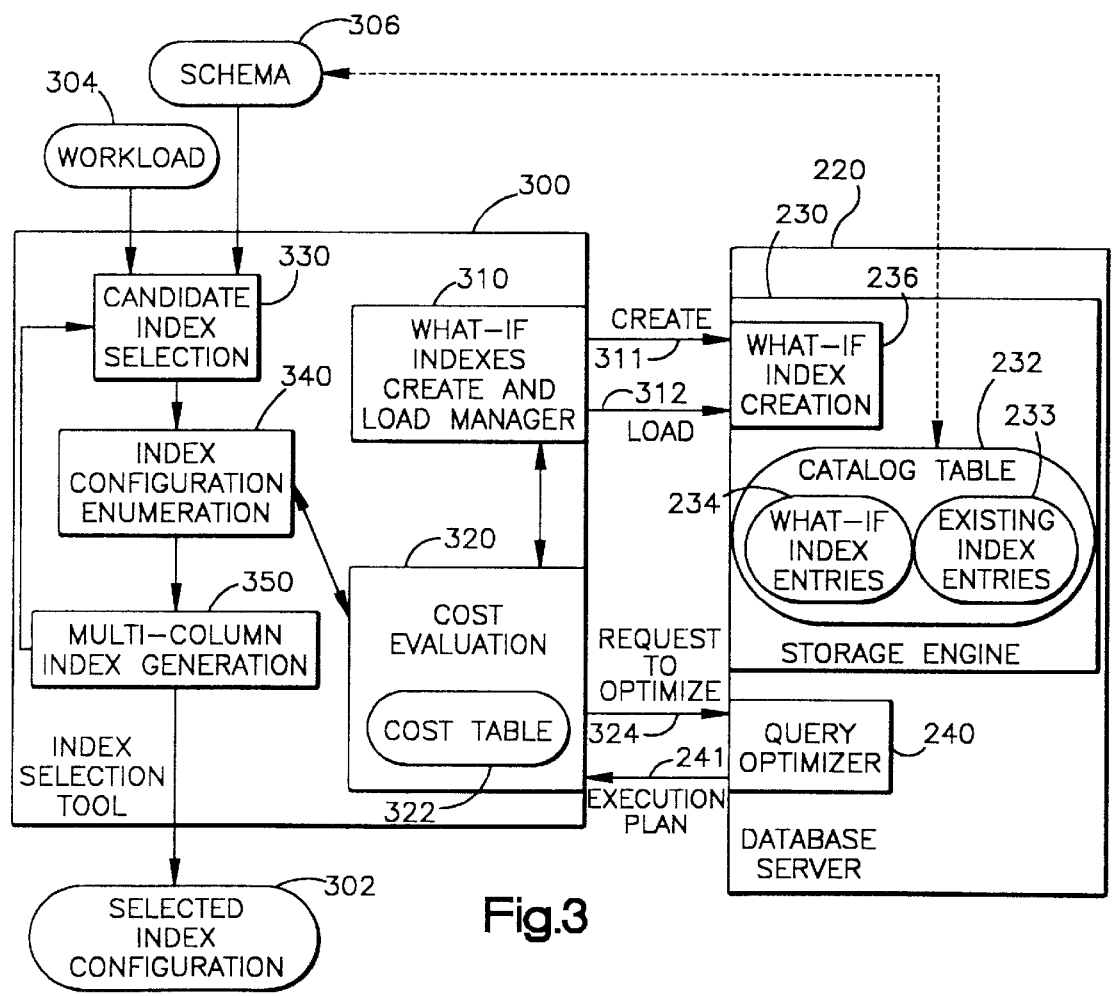
FIG. 3 illustrates, for one embodiment, the index selection tool and database server for the database system of FIG. 2.

Index selection tool 300 for one embodiment comprises a what-if indexes create and load manager 310, a cost evaluation tool 320, a candidate index selection tool 330, an index configuration enumeration tool 340, and a multi-column index generation tool 350, as illustrated in FIG. 3. Index selection tool 300 selects index configuration 302 from among candidate index configurations in accordance with workload 304, database schema 306, and query optimizer 240 of database server 220.

What-if indexes create and load manager 310 manages the creation and loading of what-if indexes for database server 220 to simulate the presence of indexes; currently absent from database server 220.

Cost evaluation tool 320 determines costs to execute queries against database 210 for candidate index configurations using query optimizer 240. Cost evaluation tool 320 helps index selection tool 300 minimize the cost in searching among candidate index configurations to select index configuration 302 by attempting to reduce the number of invocations of query optimizer 240 by index selection tool 300 in determining costs of the queries of workload 304 for each candidate index configuration.

Candidate index selection tool 330 determines a set of candidate indexes for evaluation in selecting index configuration 302. Candidate index selection tool 330 helps index selection tool 300 minimize the cost in searching among index configurations by attempting to reduce the number of indexes and therefore index configurations for evaluation by index selection tool 300 in selecting index configuration 302.

Index configuration enumeration tool 340 enumerates over a set of candidate indexes to determine an index configuration for workload 304. Index configuration enumeration tool 340 helps index selection tool 300 minimize the cost in searching among (candidate index configurations by attempting to reduce the costs incurred in evaluating candidate index configurations to select index configuration 302.

Multi-column index generation tool 350 determines indexes for evaluation in selecting index configuration 302 from among a set of indexes comprising multi-column indexes.

Index selection tool 300 may implement what-if indexes create and load manager 310, cost evaluation tool 320, candidate index selection tool 330, index configuration enumeration tool 340, and multi-column index generation tool 350 in any suitable combination with one another and/or with other suitable software to select index configuration 302. Index selection tool 300 for one embodiment uses all of what-if indexes create and load manager 310, cost evaluation tool 320, candidate index selection tool 330, index configuration enumeration tool 340, and multi-column index generation tool 350 to select index configuration 302. For other embodiments, index selection tool 300 may use less than all of what-if indexes create and load manager 310, cost evaluation tool 320, candidate index selection tool 330, index configuration enumeration tool 340, and multi-column index generation tool 350 in combination with one another and/or with other suitable software to select index configuration 302.

Database server 220, storage engine 230, query optimizer 240, index selection tool 300, what-if indexes create and load manager 310, cost evaluation tool 320, candidate index selection tool 330, index configuration enumeration tool 340, and multi-column index generation tool 350 for one embodiment are each implemented as program modules or computer-executable instructions and may be stored on any suitable computer-readable medium for execution in a suitable operating environment. The data of database 210, selected index configuration 302, workload 304, and schema 306 may be implemented in the form of one or more suitable data structures and may also be stored on any suitable computer-readable medium.

Index Simulation

Query optimizer 240 uses statistical information for each index of an index configuration to estimate costs of queries for the index configuration. Database server 220 gathers this statistical information for indexes currently existing in database server 220 and stores this statistical information as index entries 233 in a catalog table 232.

Database server 220 and index selection tool 300 for one embodiment simulate the presence of indexes that do not currently exist in database server 220 so query optimizer 240 can estimate costs of queries for index configurations comprising one or more of such absent indexes. Database server 220 gathers statistical information for indexes absent from database server 220 and stores this statistical information as what-if index entries 234 in catalog table 232. For one embodiment, what-if index entries 234 are stored similarly as existing index entries 233 only what-if index entries 234 are marked with what-if index tags to distinguish what-if index entries 234 from existing index entries 233.

During normal execution of database server 220 in accessing database 210 in accordance with various queries, query optimizer 240 ignores what-if index entries 234 and therefore generates execution plans over indexes currently existing in database server 220 only. For index selection tool 300 to consider both what-if indexes and existing indexes in evaluating candidate index configurations to select index configuration 302, index selection tool 300 may invoke query optimizer 240 in a design mode such that query optimizer 240 generates execution plans over both what-if indexes and existing indexes. Index selection tool 300 and database server 220 for one embodiment may need any administrator privileges as necessary to update catalog table 232.

Index selection tool 300 for one embodiment determines the set of one or more what-if indexes to be simulated by database server 220. For each what-if index to be simulated, what-if index create and load manager 310 of index selection tool 300 presents a create command 311 to a what-if index creation tool 236 of storage engine 230 of database server 220. Create command 311 for one embodiment is in the form of Create What-If$_{13}$ Index on <column(s)>of<table>. Because the what-if index to be simulated in accordance with create command 311 is not to be used by database server 220 in accessing any data of database 210, what-if index creation tool 236 for one embodiment does not write out pages of the what-if index to be simulated but rather only gathers statistical information for the what-if index to be simulated. For one embodiment, what-if index creation tool 236 creates a what-if index by sampling data of database 210 in accordance with a flow diagram 400 of FIG. 4.

Figure 4:
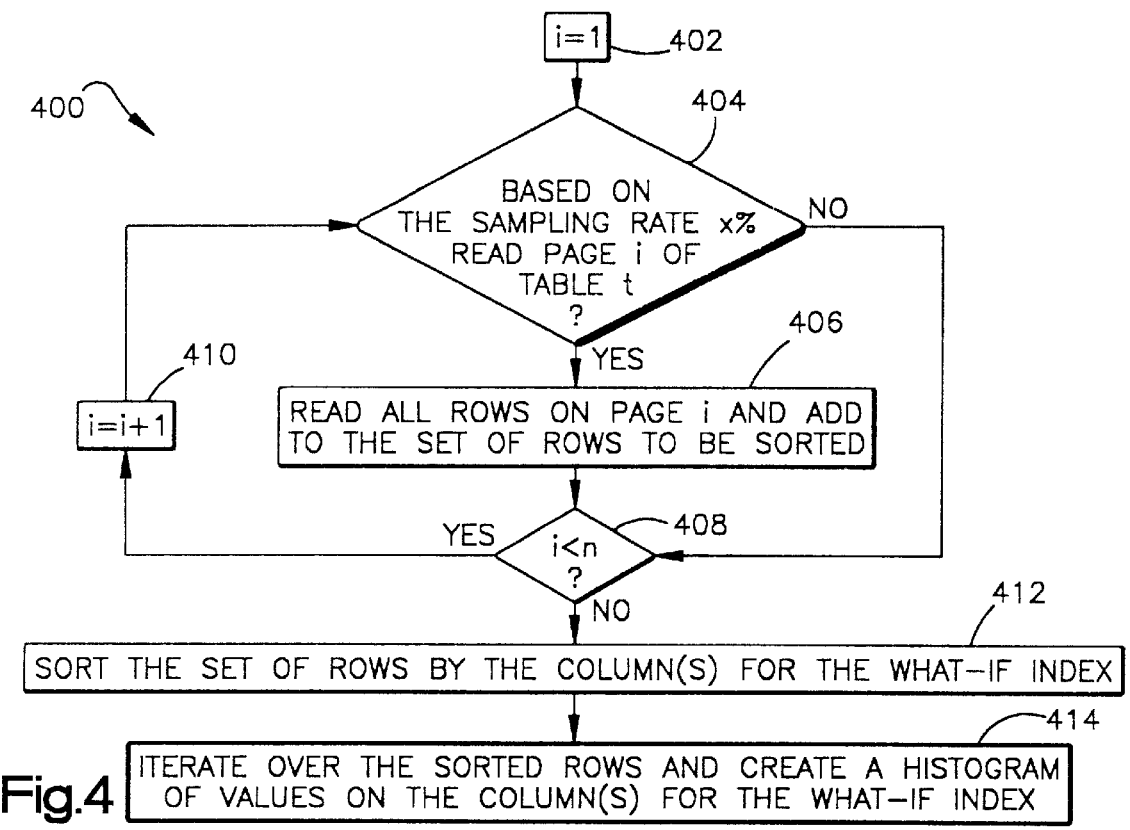
FIG. 4 illustrates, for one embodiment, a flow diagram for creating a what-if index.

For flow diagram 400 of FIG. 4, index selection tool 300 designates with create command 311 a table t and one or more columns of the table t for the what-if index to be created. What-if index creation tool 236 for steps 402, 404, 406, 408, and 410 gathers a sample of data from table t in accordance with a sampling rate of x% and for steps 412 and 414 generates the statistical information for the what-if index based on this data sampling.

What-if index creation tool 236 for step 402 initializes a variable i to 1 for use in identifying each page of the n pages of the designated table t. For step 404 of FIG. 4, what-if index creation tool 236 determines whether to read the page identified by page ID i of the table t based on the sampling rate x%. As step 404 is repeated for each of the n pages of the table t, what-if index creation tool 236 will read approximately x% of the n rages of the table t.

If what-if index creation tool 236 determines to read the page i of the table t for step 404, what-if index creation tool 236 for step 406 reads all rows of the page i and adds these rows to a set of rows that are to be sorted in generating the statistical information for the what-if index. What-if index creation tool 236 for step 408 determines whether all n pages of the table t have been evaluated for step 404 and, if not, increments the variable i for step 410 to evaluate another page for step 404. If what-if index creation tool 236 determines for step 404 that page i is not to be read, what-if index creation tool 236 proceeds directly to step 408.

What-if index creation tool 236 repeats steps 404 through 410 in this manner until what-if index creation tool 236 determines for step 408 that all n pages of the table t have been evaluated and that therefore approximately x% of the n pages of the table t have been read. What-if index creation tool 236 for step 412 sorts the set of rows gathered for step 406 by the designated one or more columns of the table t and for step 414 iterates over the sorted rows to create a histogram of values on the designated column(s). What-if index creation tool 236 has therefore gathered the statistical information for the what-if index so query optimizer 240 can estimate costs of queries for index configurations comprising the what-if index.

For another embodiment, what-if index creation tool 236 creates a what-if index by reading all n pages of the designated table t and generating the statistical information for the what-if index based on all n pages similarly as for steps 412 and 414. Gathering statistical information for what-if index entries 234 in this manner may result in relatively more accurate cost estimates by query optimizer 240 at the expense of increasing time and memory costs in reading all n pages of the table t.

Because database server 220 needs to gather statistical information for each what-if index only once, the cost of creating what-if indexes can be amortized over the determination of index configurations for multiple workloads of queries to be executed against database 210.

What-if index create and load manager 310 presents a load command 312 to what-if index creation tool 236 to load gathered statistical information for one or more designated what-if indexes as what-if index entries 234 in catalog table 232. If what-if index creation tool 236 determines a what-if index designated by load command 312 has not been created, what-if index creation tool 236 for one embodiment creates the what-if index by gathering statistical information for the what-if index and then loads this information as a what-if index entry 234.

What-if index creation tool 236 for one embodiment is implemented as a program module or computer-executable instructions and may be stored on any suitable computer-readable medium for execution in a suitable operating environment. Catalog table 232, existing index entries 233, and what-if index entries 234 may be implemented in the form of one or more suitable data structures and may also be stored on any suitable computer-readable medium.

Indexable Column Sets

In selecting index configuration 302 given the queries of workload 304 and given the data of database 210, index selection tool 300 determines indexable column sets for queries of workload 304 and for index configurations.

An indexable column set for a query is a set of one or more columns on which database server 220 may use indexes to access database 210 more efficiently in executing the query. The indexable column sets for queries of workload 304 may be used to determine a set of admissible indexes for evaluation in selecting index configuration 302. An admissible index belongs to the indexable column set of at least one query of workload 304.

For one embodiment where queries of workload 304 are DML SQL statements, the indexable column set for each query comprises the columns present in any WHERE clause where the operator is =, <, <=, >, >=, BETWEEN, or IN and where the clause is in the form of either R. a operator S.b or R.a operator expression. For the R.a operator S.b form, both column a of table R and column b of table S are considered indexable columns. For the R.a operator expression, only column a of table R is considered an indexable column. A WHERE clause can appear in Select, Update, and Insert statements, for example. Columns in GROUP BY and ORDER BY clauses are also considered indexable columns. For an Update query, the updated columns are considered indexable columns as well. For complex SQL queries having multiple WHERE clauses, the indexable column set may be considered the union of the indexable column sets of each WHERE clause in the query.

As one example, the indexable column set for the following query $Q_1$:

SELECT * FROM onektup, tenktup1
WHERE (onektup.unique1=tenktup1.unique 1)
AND (tenktup1.unique2 between 0 and 1000) is {onektup.unique1, tenktup1.unique1, tenktup1.unique2}.

The indexable column set for an index configuration is the minimum set of columns of database schema 306 such that each index in that index configuration s on one or more columns of that column set.

A required column set for a query with respect to a table of database 210 is the set of one or more columns of that table that are needed to answer the query.

Cost Evaluation of a Workload of Queries for Candidate Index Configurations

Given the queries of workload 304 and a set of candidate index configurations, cost evaluation tool 320 determines a cost of workload 304 for the candidate index configurations. Cost evaluation tool 320 uses query optimizer 240 to determine costs to execute queries of workload 304 against database 210 for the candidate index configurations. Based on the costs determined by query optimizer 240, cost evaluation tool 320 determines the cost of workload 304 for the candidate index configurations.

As illustrated in FIG. 3, cost evaluation tool 320 maintains a cost table 322 for storing a cost of each query of workload 304 and a total cost of workload 304 for each candidate index configuration. Cost table 322 may be implemented in the form of one or more suitable data structures and may also be stored on any suitable computer-readable medium. Cost table 322 for one embodiment is organized in the following table format.

|  | $Q_1$ | $Q_2$ | ... | $Q_n$ | Total Cost |
|---|---|---|---|---|---|
| $C_1$ | $Cost(Q_1,C_1)$ | $Cost(Q_2,C_1)$ | ... | $Cost(Q_n,C_1)$ | $Cost(W,C_1)$ |
| $C_2$ | $Cost(Q_1,C_2)$ | $Cost(Q_2,C_2)$ | ... | $Cost(Q_n,C_2)$ | $Cost(W,C_2)$ |
| . | . | . | ... | . | . |
| . | . | . | ... | . | . |
| . | . | . | ... | . | . |
| $C_m$ | $Cost(Q_1,C_m)$ | $Cost(Q_2,C_m)$ | ... | $Cost(Q_n,C_m)$ | $Cost(W,C_m)$ |

For this cost table, $Q_i$ represents each query of workload 304, $C_j$ represents each candidate index configuration under evaluation by cost evaluation tool 320, $Cost(Q_i,C_j)$ represents a cost as determined by cost evaluation tool 320 to execute query $Q_i$ against database 210 for candidate index configuration $C_j$, and $Cost(W,C_j)$ represents a cost to execute workload 304 against database 210 for candidate index configuration $C_j$ and is determined as the sum of the costs of each query $Q_i$ of workload 304 for candidate index configuration $C_j$.

Cost evaluation tool 320 may invoke query optimizer 240 to obtain a cost of each query of workload 304 for each candidate index configuration. As illustrated in FIG. 3, cost evaluation tool 320 for one embodiment presents a request-to-optimize command 324 designating a query and a candidate index configuration to query optimizer 240. Query optimizer 240 estimates a cost to execute the designated query for the designated candidate index configuration and returns an execution plan 241 comprising the cost estimate. For N queries of workload 304 and M candidate index configurations under evaluation by cost evaluation tool 320, cost evaluation tool 320 would have to invoke query optimizer 240 N*M times.

Cost evaluation tool 320 attempts to reduce the number of invocations of query optimizer 240 by determining costs of queries of workload 304 for one or more candidate index configurations without invoking query optimizer 240 based on costs Determined by query optimizer 240 for one or more other candidate index configurations that are atomic for workload 304.

Cost evaluation tool 320 determines a candidate index configuration is atomic for a query Q of workload 304 if the execution of the query Q against database 210 for the index configuration may use all of the indexes of the index configuration. That is, a candidate index configuration is atomic for a query Q if each index of the candidate index configuration is on one or more columns of the indexable column set of the query Q. The largest atomic index configurations for a query are also referred to as the maximal atomic index configurations.

A candidate index configuration is atomic for workload 304 if he index configuration is atomic for at least one query of workload 304. That is, a candidate index configuration is atomic for workload 304 if query optimizer 240 is to be invoked for at least one query of workload 304 to determine a total cost of workload 304 for the index configuration.

Figure 5:
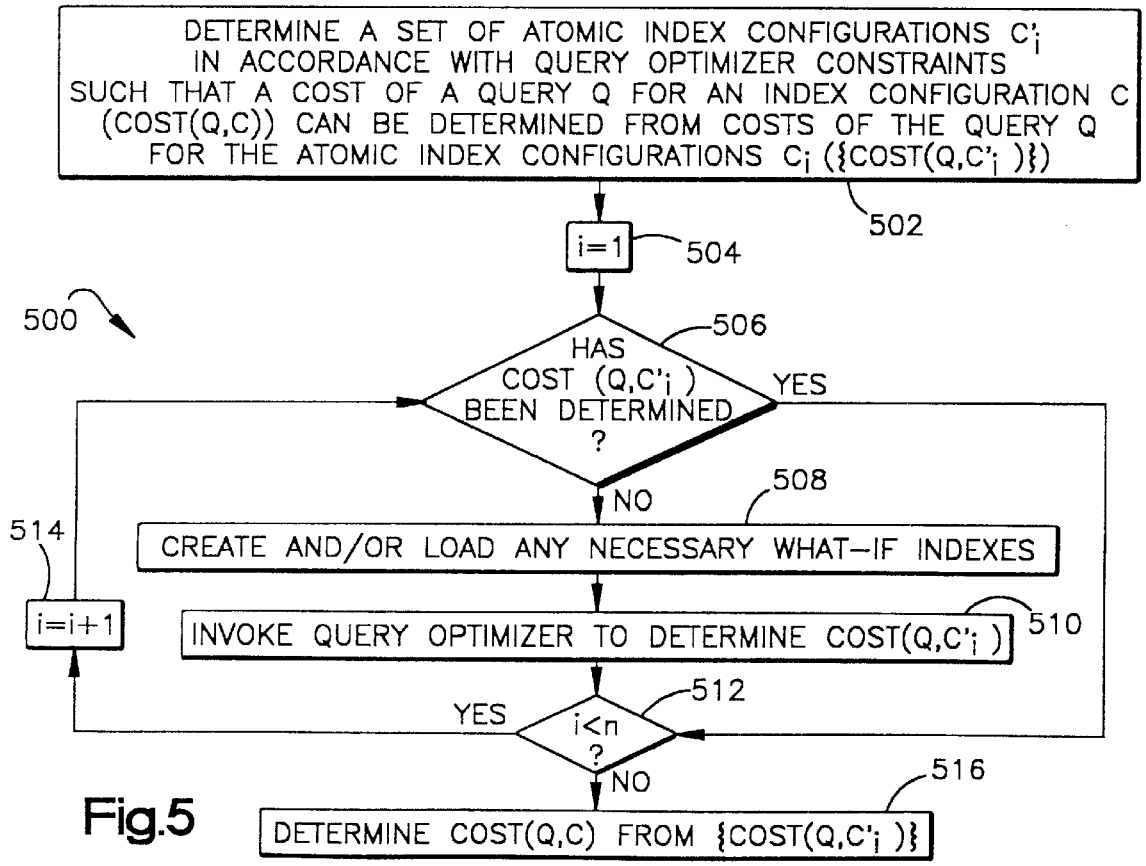
FIG. 5 illustrates, for one embodiment, a flow diagram for determining a cost of a query for an index configuration.

Cost evaluation tool 320 for one embodiment determines a cost of a query Q for a candidate index configuration C based on costs for atomic index configurations $C'_i$ in accordance with a flow diagram 500 illustrated in FIG. 5. The candidate index configuration C may or may not be an atomic index configuration.

For step 502 of FIG. 5, cost evaluation tool 320 determines a set of n atomic index configurations $\{C'_1, \ldots, C'_n\}$ from among a set of candidate index configurations such that a cost of the query Q for a candidate index configuration C, or $Cost(Q,C)$, can be determined from costs of the query Q for the atomic index configurations $C'_i$, or $\{Cost(Q,C'_i)\}$. Each of the n atomic index configurations $C'_i$ for step 502 is a subset of the candidate index configuration C.

Cost evaluation tool 320 for steps 504, 506, 508, 510, 512, and 514 of FIG. 5 determines costs of the query Q for each of the atomic index configurations $C'_i$.

For step 504, cost evaluation tool 320 initializes a variable i to 1 for use in identifying each atomic index configuration $C'_i$ determined for step 502. Cost evaluation tool 320 for step 506 determines whether a cost of the query Q for the atomic index configuration $C'_i$ has been determined. If not, cost evaluation tool 320 for step 508 uses what-if indexes create and load manager 310 to create and/or load any what-if indexes as necessary to enable query optimizer 240 to determine a cost of the query Q for the atomic index configuration $C'_i$. Cost evaluation tool 320 for step 510 then invokes query optimizer 240 to determine $Cost(Q,C'_i)$. For step 512, cost evaluation tool 320 determines whether costs for each of the n atomic index configurations $C'_i$ have been determined and, if not, increments the variable i for step 514 to evaluate another atomic index configuration $C'_i$. If cost evaluation tool 320 determines for step 506 that $Cost(Q,C'_i)$ has not been determined, cost evaluation tool 320 proceeds directly to step 512. Cost evaluation tool 320 may have previously determined the cost of the query Q for atomic index configuration $C'_i$, for example, in determining the cost of the query Q for another candidate index configuration.

Cost evaluation tool 320 repeats steps 506 through 514 in this manner until cost evaluation tool 320 determines for step 512 that costs for each of the n atomic index configurations $C'_i$ have been determined. Cost evaluation tool 320 for step 516 then determines a cost of the query Q for the candidate index configuration C from the determined costs of the query for the atomic index configurations $C'_i$ without invoking query optimizer 240. For one embodiment, cost evaluation tool 320 determines a cost of the query Q for the candidate index configuration C as the minimum of the determined costs of the query Q for the atomic index configurations $C'_i$, that is $Cost(Q,C)=Min\{Cost(Q,C'_i)\}$. Because inclusion of an index in an index configuration can only reduce the cost of some queries, such as an SQL Select query for example, cost evaluation tool 320 may determine a cost of such a query Q for a candidate index configuration C as the minimum cost of the query Q for the largest atomic index configurations $C'_i$.

As one example, let $I_1$, $I_2$, and $I_3$ be one-column indexes on onektup.unique1, tenktup1.unique1, and tenktup1.unique2, respectively, for the following query $Q_1$.

SELECT * FROM onektup, tenktup1
WHERE (onektup.unique1=tenktup1.unique1)
AND (tenktup1.unique2 between 0 and 1000)

Let $I_4$ be an index on a different column in the indexable column set of another query. The determined cost to execute the query $Q_1$ for the index configuration $C=\{I_1, I_2, I_4\}$ is the minimum cost to execute the query $Q_1$ for the atomic index configurations for the query $Q_1$ that are subsets of the index configuration C, that is for the atomic index configurations $\{\ \}$, $\{I_1\}$, $\{I_2\}$, and $\{I_1, I_2\}$.

Cost evaluation tool 320 may determine costs of any suitable query, such as SQL Select and Update queries for example, in accordance with flow diagram 500. The cost of a query Q such as an SQL Insert or Delete query, for example, depends on the following cost factors:

(1) the cost of selection,
(2) the cost of updating the table and the indexes that may be used for selection, and
(3) the cost of updating indexes that do not affect the selection cost.

Costs of updating each index I for cost factor (3) are independent of one another and are also independent of the execution plan selected by query optimizer 240 for cost factors (1) and (2). Query optimizer 240 will therefore select an execution plan that minimizes cost factors (1) and (2) of the query Q for an index configuration C.

Similar to the determination of costs for queries such as SQL Select and Update queries, cost evaluation tool 320 for one embodiment determines for cost factors (1) and (2) a cost T of the query Q for the index configuration C as the determined minimum cost over the atomic index configurations for the query Q that are subsets of the index configuration C. Cost evaluation tool 320 for one embodiment determines for cost factor (3) a cost of the query Q as the sum of the determined cost of the query Q for each index $I_j$ for cost factor (3), that is $\Sigma_j (Cost(Q,\{I_j\})-Cost(Q,\{\ \}))$. Cost evaluation tool 320 therefore determines a total cost of the query Q for the index configuration C as the sum of costs for cost factors (1), (2), and (3), that is $Cost(Q,C)=T+\Sigma_j (Cost(Q,\{I_j\})-Cost(Q,\{\ \}))$.

The total number of atomic index configurations for workload 304 can be very large. The number of atomic index configurations for multi-table queries, for example, is exponential relative to the number of tables. Because the characteristics of database server 220 influence whether query optimizer 240 must be invoked to determine a cost of a query for an index configuration, cost evaluation tool 320 for step 502 may reduce the set of atomic index configurations $C'_i$ by excluding one or more candidate index configurations in accordance with one or more constraints of query optimizer 240. Also, every candidate index may potentially be either a clustered index for a table or a non-clustered index. Because the choice of the clustered index for a table affects the choice of indexes over other tables, the choice of the clustered index for a table cannot be made local to the table.

As one exemplary optimizer constraint, database server 220 typically intersects at most some predetermined number of indexes, whether clustered or non-clustered, to identify tuples of one relation. Cost evaluation tool 320 for step 502 may therefore exclude from the set of atomic index configurations any candidate index configurations comprising more than the predetermined number of indexes for any one table or correlation of database 210. The predetermined number of indexes for one embodiment is two. For another embodiment where database server 220 does not support index intersection, for example, the predetermined number may be one.

As another exemplary optimizer constraint, the first few joins of a multi-table query typically impact the cost to execute the query the most. Cost evaluation tool 320 for step 502 may therefore exclude from the set of atomic index configurations any candidate index configurations comprising indexes on more than a predetermined number of tables. The predetermined number of indexes for one embodiment is two. Atomic index configurations comprising indexes on at most two tables as determined for step 502 in accordance with this optimizer constraint are referred to as single-join atomic index configurations. Similarly, n-join atomic index configurations refers to atomic index configurations comprising indexes on at most n+1 tables.

As one example for a Select query with conditions $T_1.A<20$, $T_1.A=T_2.B$, $T_3.C$ BETWEEN [30,50], and $T_3.C=T_2.B$, one atomic index configuration for this query would be $(T_1.A, T_2.B, T_3.C)$ because indexes on all three of these tables may be used to answer the query. Because of a single-join atomic index configuration constraint, however, cost evaluation tool 320 would not evaluate this three-table atomic index configuration. Cost evaluation tool 320 therefore determines a cost of the query for this atomic index configuration as the minimum cost for the two-table atomic index configurations $(T_1.A, T_2.B)$, $(T_1.A, T_3.C)$, and $(T_2.B, T_3.C)$.

In accordance with another exemplary optimizer constraint, cost evaluation tool 320 for step 502 may also exclude from the set of atomic index configurations; any candidate index configurations comprising one index on a table of database 210 for exploiting a join condition and comprising a different index on the same table for exploiting a selection condition.

As one example, let $I_1$, $I_2$, and $I_3$ be one-column indexes on onektup.unique1, tenktup1.unique1, and tenktup1.unique2, respectively, for the following query $Q_1$.

SELECT * FROM onektup, tenktup1
WHERE (onektup.unique1=tenktup1.unique1)
AND (tenktup1.unique2 between 0 and 1000) The set of atomic index configurations for the query $Q_1$ comprises $\{\ \}$, $\{I_1\}$, $\{I_2\}$, $\{I_3\}$, $\{I_1, I_2\}$, $\{I_1, I_3\}$. The index configurations $\{I_2, I_3\}$ and $\{I_1, I_2, I_3\}$ may be excluded from this set of atomic index configurations because the indexes $I_2$ and $I_3$ must use a join predicate and a selection predicate, respectively, on the same table tenktup1.

Cost evaluation tool 320 for one embodiment may determine, based on the interaction among indexes of an atomic index configuration, whether the cost of a query for the atomic index configuration needs to be determined in order to determine a cost of the query for another index configuration.

Figure 12:
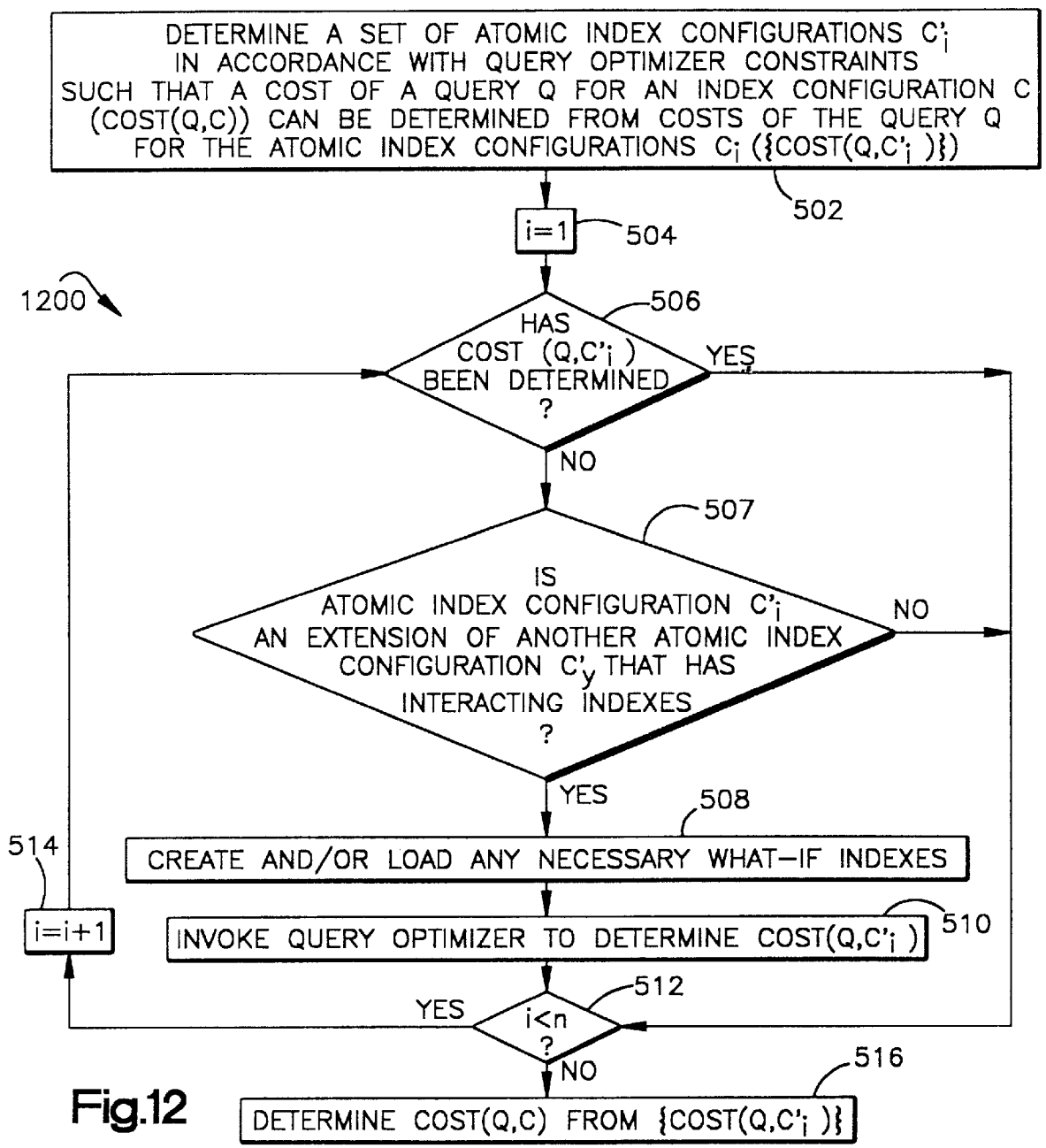
FIG. 12 illustrates, for another embodiment, a flow diagram for determining a cost of a query for an index configuration.

With reference to flow diagram 1200 of FIG. 12, cost evaluation tool 320 for one embodiment may determine whether to invoke query optimizer 240 for an atomic index configuration $C'_i$ even though the atomic index configuration $C'_i$ has not been evaluated as determined for step 506 of FIG. 12.

Figure 13:
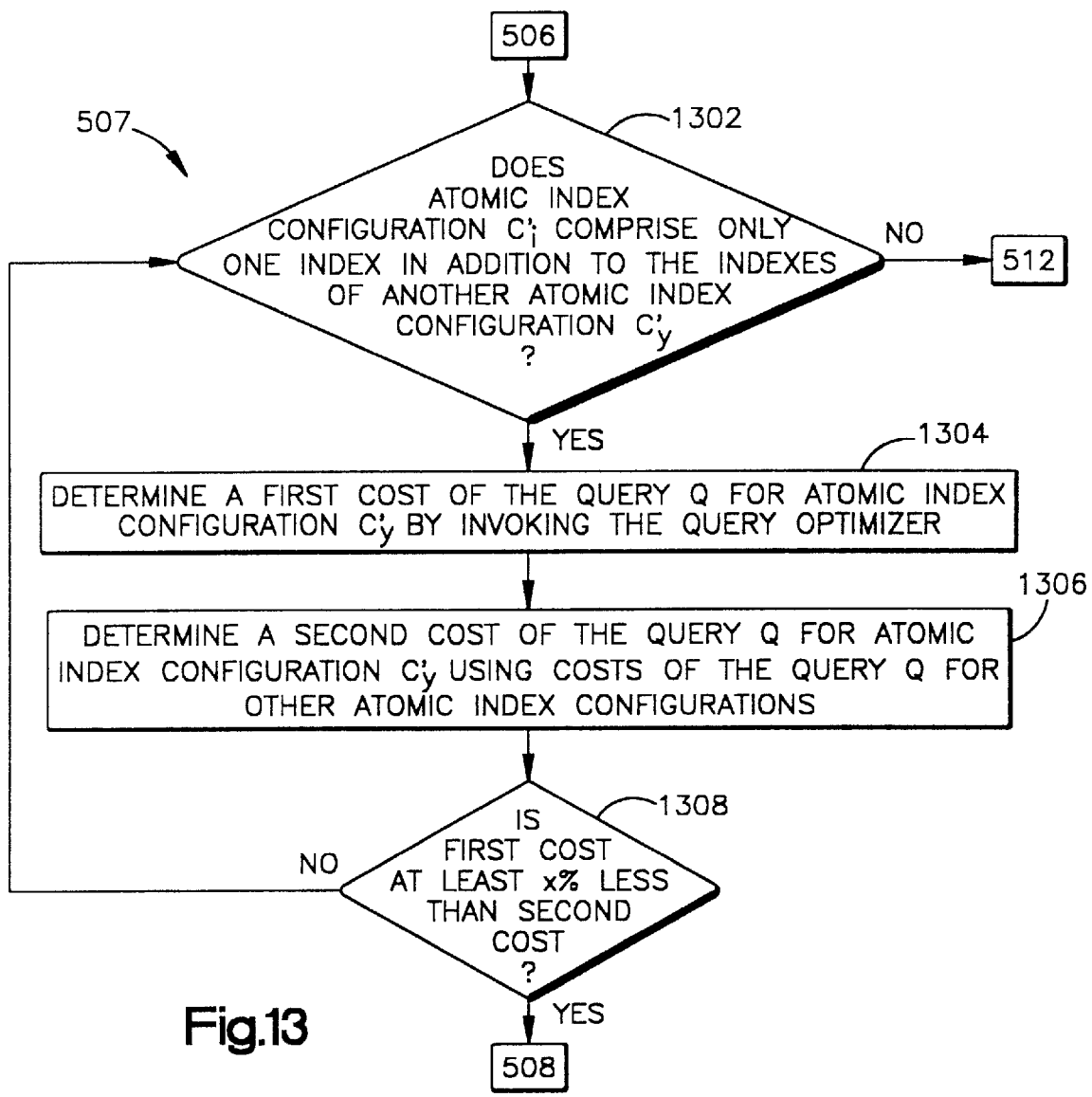
FIG. 13 illustrates a flow diagram for determining whether an atomic index configuration is an extension of another atomic index configuration that has interacting indexes.

If cost evaluation tool 320 determines for step 506 that the atomic index configuration $C'_i$ has not been evaluated, cost evaluation tool 320 may determine for step 507 whether the atomic index configuration $C'_i$ is an extension of another atomic index configuration $C'_y$ that has been determined to comprise interacting indexes. With reference to FIG. 13, cost evaluation tool 320 determines an atomic index configuration $C'_i$ is an extension of another index configuration $C'_y$ for step 507 if the atomic index configuration $C'_i$ comprises all indexes of the index configuration $C'_y$ and only one additional index that is a member of the current set of candidate indexes (step 1302). Cost evaluation tool 320 determines atomic index configuration $C'_y$ comprises interacting indexes for step 507 if the evaluated cost of the query Q for the atomic index configuration $C'_y$, as determined by invoking query optimizer 240 for the query Q and the atomic index configuration $C'_y$ (step 1304), is at least x% less (step 1308) than the derived cost of the query Q for the atomic index configuration $C'_y$, as determined by deriving the cost of the query Q for the atomic index configuration $C'_y$ using costs of the query Q for other atomic index configurations (step 1306). The variable x may have any suitable predetermined value and for one embodiment is 20%. The value of the variable x for one embodiment may be determined by a user of index selection tool 300.

If cost evaluation tool 320 for step 507 determines the atomic index configuration $C'_i$ is an extension of another atomic index configuration $C'_y$ that has been determined to comprise interacting indexes, cost evaluation tool 320 determines the cost of the query Q for the atomic index configuration $C'_i$ for steps 508 and 510 of FIG. 12. Otherwise, cost evaluation tool 320 proceeds to step 512 without determining the cost of the query Q for the atomic index configuration $C'_i$.

For an Update, Insert, or Delete query Q, cost evaluation tool 320 determines atomic index configuration $C'_y$ comprises interacting indexes for step 507 if the evaluated cost of the query Q for the atomic index configuration $C'_y$ is at least z% different than the derived cost of the query Q for the atomic index configuration $C'_y$. The variable z may have any suitable predetermined value and for one embodiment is 20%. The value of the variable z for one embodiment may be determined by a user of index selection tool 300.

Cost evaluation tool 320 may attempt to further reduce the number of invocations of query optimizer 240 by determining costs of queries for one or more atomic index configurations based on costs determined by query optimizer 240 for other atomic candidate index configurations.

Only indexes on one or more columns of the indexable column set P for a query Q such as an SQL Select or Update query, for example, affects the cost of the query Q. Cost evaluation tool 320 for one embodiment may therefore determine a cost of the query Q for an index configuration C as the cost of the query Q for an index configuration C'' that is the largest subset of the index configuration C and that has an indexable column set equal to the intersection of the indexable column set P for the query Q and the indexable column set P' for the index configuration C. That is, Cost(Q,C)=Cost(Q,C''). Any index that is not in the index configuration C'' does not affect the cost of the query Q for the index configuration C. The determination of costs in this manner is referred to as relevant index set optimization. If the index configuration C'' is empty, the determined cost of the query Q for the index configuration C is the same as that over database 210 with no indexes. The determination of costs in this manner is referred to as irrelevant index set optimization.

In determining a cost of a query Q for an index configuration C, cost evaluation tool 320 for one embodiment may attempt to reduce the number of atomic index configurations for step 502 of FIG. 5 by determining the set of atomic index configurations $C'_i$ in accordance with the relevant index set optimization technique.

As one example of relevant index set optimization, let $I_1$ and $I_2$ be indexes on onektup.unique1 and tenktup.unique1, respectively. The determined cost of the following query $Q_2$:

SELECT * FROM onektup
WHERE unique1<100 for the index configuration $\{I_1,I_2\}$ is the determined cost of the query $Q_2$ for the index configuration $\{I_1\}$, that is $Cost(Q_2,\{I_1,I_2\})=Cost(Q_2,\{I_1\})$, as the indexable column set of query $Q_2$ is {onektup.unique1} and the indexable column set of the index configuration {I1, I2} is {onektup.unique1, tenktup.unique1}. If cost evaluation tool 320 has already determined $Cost(Q_2,\{I_1\})$, cost evaluation tool 320 may then determine $Cost(Q_2,\{I_1,I_2\})$ without invoking query optimizer 240.

Cost evaluation tool 320 may determine costs with the relevant index set optimization technique for any suitable query, such as SQL Select and Update queries, for example. The cost of a query Q such as an SQL Insert or Delete query, for example, may not be determined with the relevant index set optimization technique because insertions and deletions affect all indexes on a table. The costs for updating each index $I_i$ that is not a member of any atomic index configuration for the query Q, however, are independent of one another. Cost evaluation tool 320 may therefore determine a cost of the query Q for an index configuration $P_i=P+\{I_i\}$ comprising an atomic index configuration P for the query Q and an index $I_i$ that is not a member of any atomic index configuration for the query Q as the sum of the determined cost of the query Q for the atomic index configuration P and the determined cost to update the index $I_i$. That is Cost(Q, $P_i$)=Cost(Q,P)+Index-Update-Cost(Q,$\{I_1\}$). If cost evaluation tool 320 has already determined Cost(Q,P) and Index-Update-Cost(Q,$\{I_1\}$), cost evaluation tool 320 may then determine Cost(Q,$P_i$) without invoking query optimizer 240.

Cost evaluation tool 320 for one embodiment helps reduce the number of invocations of query optimizer 240 by evaluating atomic index configurations for flow diagram 500 of FIG. 5, for example, in order of increasing configuration size. Cost evaluation tool 320 may evaluate single-table atomic index configurations in order of increasing configuration size, that is, single indexes over single columns, single indexes over multi-columns, and single table index configurations with multiple indexes in order of increasing configuration size, and may then evaluate multi-table atomic index configurations in order of increasing configuration size.

Cost evaluation tool 320 for one embodiment invokes query optimizer 240 on-demand. That is, cost evaluation tool 320 invokes query optimizer 240 to determine a cost of the query Q for each atomic index configuration $C'_i$ only as needed to determine a cost of the query Q for the index configuration C.

Cost evaluation tool 320 for one embodiment invokes query optimizer 240 in batches of queries so that cost estimates for more than one query over the same index configuration may be determined. Batching queries in this manner helps reduce costs otherwise incurred in presenting each index configuration/query pair to query optimizer 240 separately and also helps ensure that the loading of what-if indexes to determine costs of queries for an index configuration is performed only once. Cost evaluation tool 320 for one embodiment invokes query optimizer 240 in a no-execution mode so as to request from query optimizer 240 only cost estimates of queries for index configurations.

Candidate Index Selection for a Workload

Given the queries of workload 304, candidate index selection tool 330 determines a set of candidate indexes and therefore candidate index configurations for evaluation by index selection tool 300 in selecting index configuration 302.

The set of candidate indexes for evaluation by index selection tool 300 may comprise each possible combination of admissible indexes for workload 304. An admissible index belongs to the indexable column set of at least one query of workload 304. The space of all admissible indexes and therefore candidate index configurations over database 210 can be very large and can incur a significant cost in time and memory in searching the space of candidate index configurations to select index configuration 302.

Figure 6:
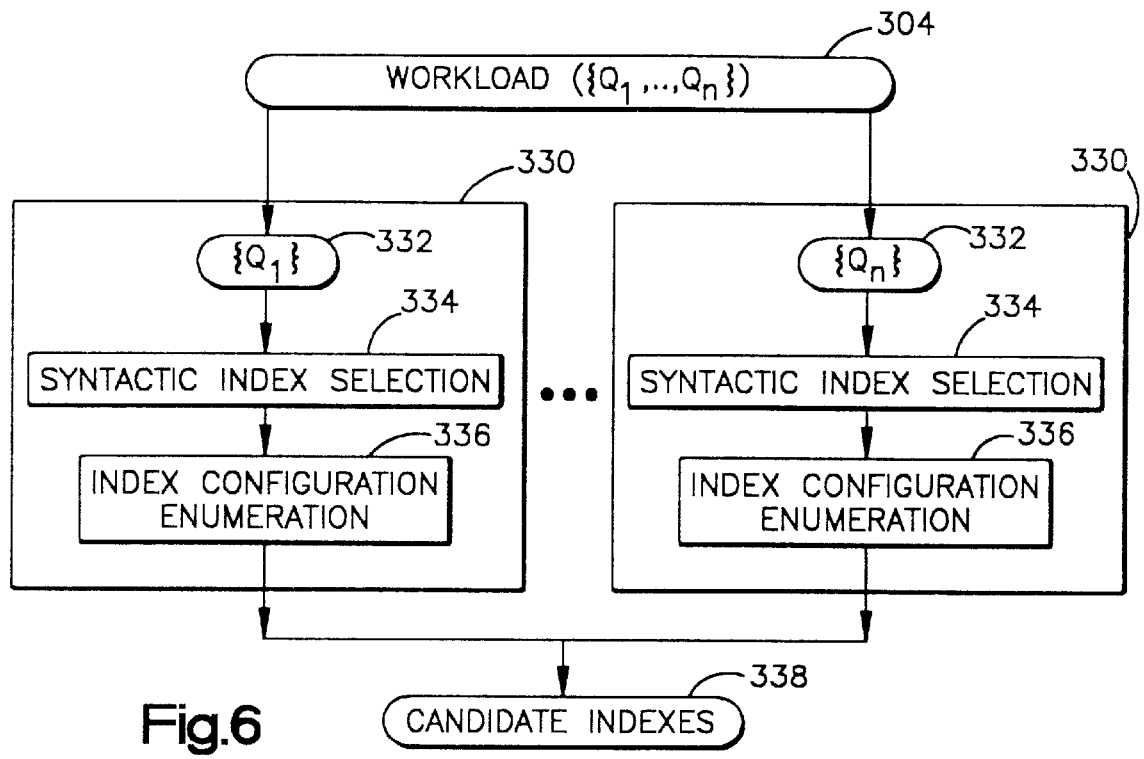
FIG. 6 illustrates, for one embodiment, a candidate index selection tool for selecting candidate indexes for a workload of queries.

Candidate index selection tool 330 attempts to reduce the number of indexes and therefore index configurations for evaluation for the queries of workload 304 by determining a query-specific index configuration for each query of workload 304. As illustrated in FIG. 6, candidate index selection tool 330 determines a set of candidate indexes 338 for evaluation by index selection tool 300 as the union of indexes of the determined query-specific index configurations. This technique is referred to as query-specific-best-configuration candidate index selection and presumes an index that is not a member of an optimal index configuration for any query of workload 304 would not likely be selected as a member of an optimal index configuration for the entire workload 304.

Candidate index selection tool 330 for one embodiment comprises a syntactic index selection tool 334 and an index configuration enumeration tool 336, as illustrated in FIG. 6. Syntactic index selection tool 334 and index configuration enumeration tool 336 for one embodiment are each implemented as program modules or computer-executable instructions and may be stored on any suitable computer-readable medium for execution in a suitable operating environment. FIG. 6 illustrates n candidate index selection tools 330 to represent that candidate index selection tool 330 determines an index configuration for each of the n queries of workload 304. Candidate index selection tool 330 for one embodiment determines candidate indexes 338 in accordance with a flow diagram 700 illustrated in FIG. 7.

Figure 7:
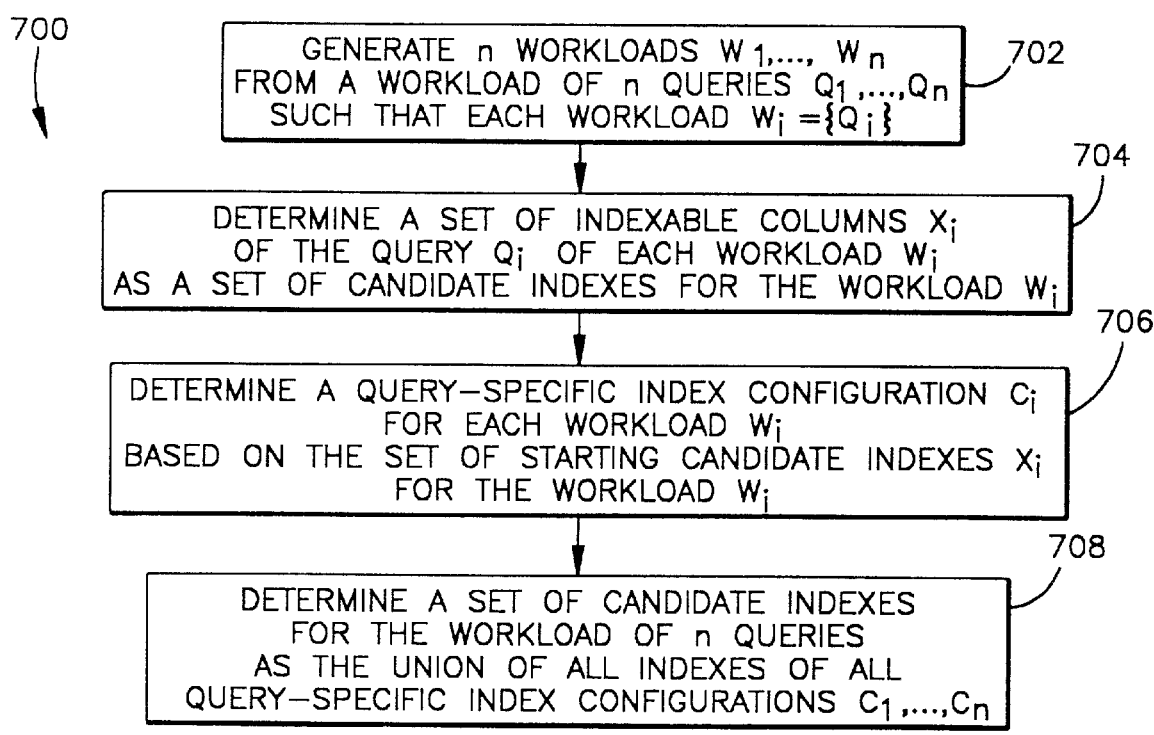
FIG. 7 illustrates, for one embodiment, a flow diagram for selecting candidate indexes for a workload of queries.

For step 702 of FIG. 7, candidate index selection tool 330 identifies each query $Q_i$ among the queries $Q_1, \ldots, Q_n$ of workload 304 to determine an index configuration for each query $Q_i$. Candidate index selection tool 330 for one embodiment generates n workloads $W_1, \ldots, W_n$ 332 from the queries $Q_1, \ldots, Q_n$ of workload 304 such that each workload $W_i$ 332 consists of a respective one of the queries $Q_i$, that is $W_i = \{Q_i\}$. For step 704 of FIG. 7, syntactic index selection tool 334 determines a set of one or more indexes $X_i$ of each query $Q_i$ of workload 304. The determined set of indexes $X_i$ are candidate indexes for evaluation in determining an index configuration for the query $Q_i$. For a query $Q_i$ with no insert, delete, or update, syntactic index selection tool 334 for one embodiment determines the set of indexes $X_i$ as comprising indexes on each column in the set of one or more indexable columns of the query $Q_i$ of each workload $W_i$ 332.

For step 706 of FIG. 7, index configuration enumeration tool 336 determines a query-specific index configuration $C_i$ for each workload $W_i$ 332 and therefore for each query $Q_i$ based on the respective set of candidate indexes $X_i$ for the workload $W_i$ 332. Index configuration enumeration tool 336 determines the query-specific index configuration $C_i$ from among possible candidate index configurations of candidate indexes $X_i$.

Index configuration enumeration tool 336 for one embodiment determines a cost to execute each query $Q_i$ against database 210 for each of the possible candidate index configurations of candidate indexes $X_i$ and selects the query-specific index configuration $C_i$ as the candidate index configuration having the least determined total cost. Index configuration enumeration tool 336 for one embodiment uses cost evaluation tool 320 to determine costs for step 706. Index configuration enumeration tool 336 for one embodiment is one in the same as index configuration enumeration tool 340 of FIG. 3.

Index configuration enumeration tool 336 may determine each query-specific index configuration $C_i$ with an upper bound on the number of indexes for each query-specific index configuration $C_i$. That is, index configuration enumeration tool 336 may select each query-specific index configuration $C_i$ from among the possible candidate index configurations having at most a predetermined number of candidate indexes $X_i$.

If a query $Q_i$ does not have any updates and if index configuration enumeration tool 336 does not limit the number of indexes of each query-specific index configuration $C_i$, the query-specific index configuration $C_i$ selected for the query $Q_i$ will have a less or equal total cost for the query $Q_i$ as compared to any other candidate index configuration for the query $Q_i$.

For a query $Q_i$ that has updates or if index configuration enumeration tool 336 does limit the number of indexes of each query-specific index configuration $C_i$, index configuration enumeration tool 336 for one embodiment may select more than one query-specific index configuration $C_{i1}, \ldots, C_{ij}$ for the query $Q_i$ as index configuration enumeration tool 336 may not recommend any index if the determined cost of the query $Q_i$ is relatively high. Index configuration enumeration tool 336 may or may not select the same number of query-specific index configurations $C_{i1}, \ldots, C_{ij}$ for each query $Q_i$, and may select relatively more alternative query-specific index configurations $C_{i1}, \ldots, C_{ij}$ for queries $Q_i$ having relatively higher costs.

As one example for a workload comprising a query Q with two indexable columns $T_1.C_1$ and $T_2.C_2$ an insert query U on $T_1$ such that the query-specific index configuration $C_i$ for the query Q consists of an index on $T_1.C_1$ only, index configuration enumeration tool 336 may not recommend any index if the determined cost of the query U is high because the indexable column $T_2.C_2$ will not be considered. Index configuration enumeration tool 336 may therefore select more than one query-specific index configuration for the query Q.

Because query optimizer 240 will select among non-clustered indexes depending on the clustered indexes selected for each table of database 210, index configuration enumeration tool 336 for one embodiment invokes query optimizer 240 with multiple index configurations each of which corresponds to a distinct set of clustered indexes, one for each table, and with the remaining indexable columns of the query $Q_i$ considered as non-clustered indexes. Although query optimizer 240 may have to be invoked to evaluate many index configurations for multijoin queries, for example, these index configurations need to be evaluated for only one query.

The problem of selecting a query-specific index configuration is similar to the overall problem of selecting index configuration 302 for workload 304, only the workload in selecting the query-specific index configuration consists of only one query. Index configuration enumeration tool 336 for one embodiment is therefore index configuration enumeration tool 340 of FIG. 3. That is, the implementation of selecting index configurations for each query of workload 304 may be bootstrapped onto the implementation of selecting index configuration 302 for workload 304.

Candidate index selection tool 330 for one embodiment may perform steps 702, 704, and 706 in succession for one query $Q_i$ of workload 304 at a time and repeat steps 702, 704, and 706 for each query $Q_i$ of workload 304 until a query-specific index configuration $C_i$ has been selected for all queries $Q_1, \ldots, Q_n$ of workload 304. For another embodiment, candidate index selection tool 330 may perform step 702 for all queries $Q_1, \ldots, Q_n$ of workload 304 and then perform step 704 for all queries $Q_1, \ldots, Q_n$ of workload 304 and then perform step 706 for all queries $Q_1, \ldots, Q_n$ of workload 304.

For step 708 of FIG. 7, candidate index selection tool 330 determines a set of candidate indexes 338 as the union of all indexes of the determined query-specific index configuration $C_1, \ldots, C_n$ for evaluation by index selection tool 300 to select index configuration 302 for workload 304.

Although candidate index selection tool 330 selects indexes for evaluation by index selection tool 300 from index configurations $C_i$ for each query $Q_i$, one or more indexes that are members of a next-best query-specific index configuration for the query $Q_i$ may appear in the selected index configuration for another query. For selected index configurations $C_i$ having multiple indexes, indexes that are a member of a next-best query-specific index configuration for one query may also be a member of the selected index configuration for another query. By not limiting the number of indexes of each query-specific index configuration $C_i$, indexes that are members of next-best query-specific index configurations may be more likely included in the determined set of candidate indexes 338.

For another embodiment, candidate index selection tool 330 determines one or more query-specific index configurations $C_{i1}, \ldots, C_{ij}$ for each workload $W_i$ 332 and therefore for each query $Q_i$ to help ensure the set of candidate indexes 338 includes indexes that are members of a next-best query-specific index configuration for each query $Q_i$. Index configuration enumeration tool 336 determines a cost to execute each query $Q_i$ against database 210 for each of the possible candidate index configurations of candidate indexes $X_i$ and selects for each query $Q_i$ the candidate index configuration $C_{i1}$ having the least determined total cost as well as any other candidate index configurations $C_{ij}$ determined to have a total cost within a predetermined percent of the least determined total cost. The predetermined percent is approximately ten percent for one embodiment. Candidate index selection tool 330 then determines the set of candidate indexes 338 for evaluation by index selection tool 300 as the union of all indexes of the selected one or more candidate index configurations $C_{i1}, \ldots, C_{ij}$ for each query $Q_i$.

Index Configuration Enumeration for a Workload and Database

Given the queries of workload 304 and a set of candidate indexes, index configuration enumeration tool 340 enumerates over the set of candidate indexes to determine a suitable index configuration for workload 304 from among the set of candidate indexes.

Index configuration enumeration tool 340 could exhaustively enumerate over all possible candidate index configurations of the candidate indexes using cost evaluation tool 320 in accordance with flow diagram 500 of FIG. 5, for example, and determine an optimal index configuration for workload 304 as the candidate index configuration having the least total cost.

Index configuration enumeration tool 340 and cost evaluation tool 320 may, for example, determine query costs for a set of all atomic index configurations for workload 304 from the set of candidate indexes. Based on the costs for the atomic index configurations, a total cost for each candidate index configuration may be determined and the candidate index configuration having the least total cost may be selected as an optimal index configuration for workload 304. Index configuration enumeration tool 340 may, however, incur a significant cost in time and memory in searching a relatively large space of candidate index configurations in this manner.

Index configuration enumeration tool 340 for one embodiment attempts to reduce the cost in searching among candidate index configurations to determine a suitable index configuration by reducing the number of atomic index configurations to be evaluated in determining costs for the candidate index configurations and therefore reducing the number of invocations of query optimizer 240. Index configuration enumeration tool 340 for one embodiment uses a greedy enumeration algorithm in accordance with a flow diagram 800 of FIG. 8. The greedy enumeration algorithm of FIG. 8 may be referred to as Greedy(m,k,j) where m, k, and j are input values for the greedy enumeration algorithm.

Figure 8:
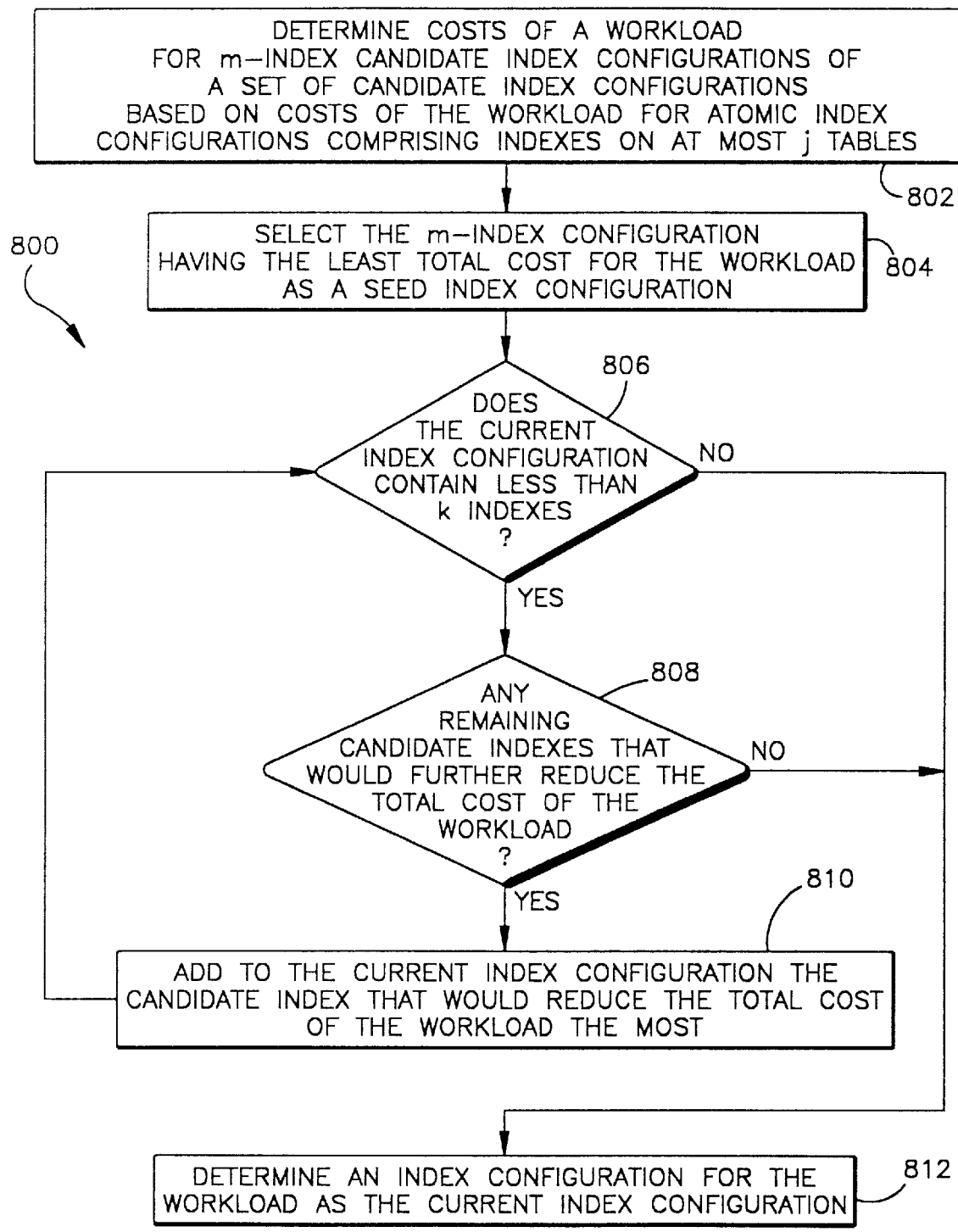
FIG. 8 illustrates, for one embodiment, a flow diagram for determining an index configuration for a workload of queries in accordance with a greedy algorithm.

For step 802 of FIG. 8, index configuration enumeration tool 340 determines from a set of candidate index configurations the candidate index configurations having at most m indexes. If the value of m is greater than the value of k, then m is set equal to k for step 802. Index configuration enumeration tool 340 then uses cost evaluation tool 320 to determine costs of the queries of workload 304 for the at most m-index candidate index configurations based on costs of the queries of workload 304 for n-join atomic index configurations comprising indexes on at most j tables, where n=j−1.

By restricting the number of candidate index configurations for exhaustive enumeration to those comprising at most m indexes and/or by restricting the set of atomic index configurations for evaluation to those comprising indexes on at most j tables, index configuration enumeration tool 340 may reduce the number of atomic index configurations for evaluation in searching among the set of candidate index configurations.

For step 804 of FIG. 8, index configuration enumeration tool 340 selects the m-index candidate index configuration having the least total cost for workload 304 as a seed index configuration for the greedy algorithm.

Index configuration enumeration tool 340 for step 806 determines whether the current index configuration contains less than a predetermined number k of indexes. If so, index configuration enumeration tool 340 determines for step 808 whether the addition of any one of the remaining candidate indexes that are not already a member of the current index configuration would further reduce the total cost of workload 304. If both conditions are satisfied, index configuration enumeration tool 340 for step 810 adds the candidate index of the remaining candidate indexes that would reduce the total cost of workload 304 the most.

Index configuration enumeration tool 340 repeats steps 806, 808, and 810 until index configuration enumeration tool 340 determines for step 806 that the current index configuration contains k indexes or until index configuration enumeration tool 340 determines for step 808 that the inclusion of any additional candidate index would not reduce the cost of workload 304. Index configuration enumeration tool 340 then determines for step 812 an index configuration as the current index configuration. Index selection tool 300 may use the index configuration determined for step 812 as selected index configuration 302.

With the greedy enumeration algorithm, index configuration enumeration tool 340 therefore combines an exhaustive phase for steps 802 and 804 with a greedy phase for steps 806, 808, and 810. The exhaustive phase helps capture index interactions, such as merge join using two clustered indexes and single table index intersection for example, that may have a significant effect the cost of workload 304 while the greedy phase attempts to add one or more candidate indexes that can alone significantly reduce the cost of workload 304 despite any interaction among indexes.

As one example, the join order of any single query is often determined primarily by sizes of intermediate relations and the presence or absence of a few significant indexes. Once the join order has been determined, other indexes typically only help reduce the cost of a join locally and do not interact with indexes used in other operations. Using the greedy enumeration algorithm, index configuration enumeration tool 340 may select significant interacting indexes that affect the join order and subsequently select the remaining indexes greedily.

Index configuration enumeration tool 340 would determine an index configuration in a purely greedy manner with m=0 or in an exhaustive manner if m=k. If m>k , then m is set equal to k for one embodiment. The greedy enumeration algorithm may be computationally efficient and exhibit relatively near-greedy behavior if the value of m is relatively small compared to the value of k. The value of m relative to the value of k reflects a desired degree of completeness of enumeration.

For another embodiment, index configuration enumeration tool 340 for step 804 selects one or more seed index configurations each comprising at most m indexes. Index configuration enumeration tool 340 for one embodiment selects as a seed index configuration the at most m-index candidate index configuration having the least total cost for workload 304 as well as any other at most m-index candidate index configurations having for workload 304 a total cost within a predetermined percent of the least total cost. The predetermined percent is approximately ten percent for one embodiment. Index configuration enumeration tool 340 performs steps 806 through 812 for each selected seed index configuration to determine one or more corresponding current index configurations and then selects one of the one or more corresponding current index configurations. For one embodiment, index configuration enumeration tool 340 selects a corresponding current index configuration that has the minimum total cost for workload 304. Index selection tool 300 may use the selected index configuration as selected index configuration 302.

Figure 9:
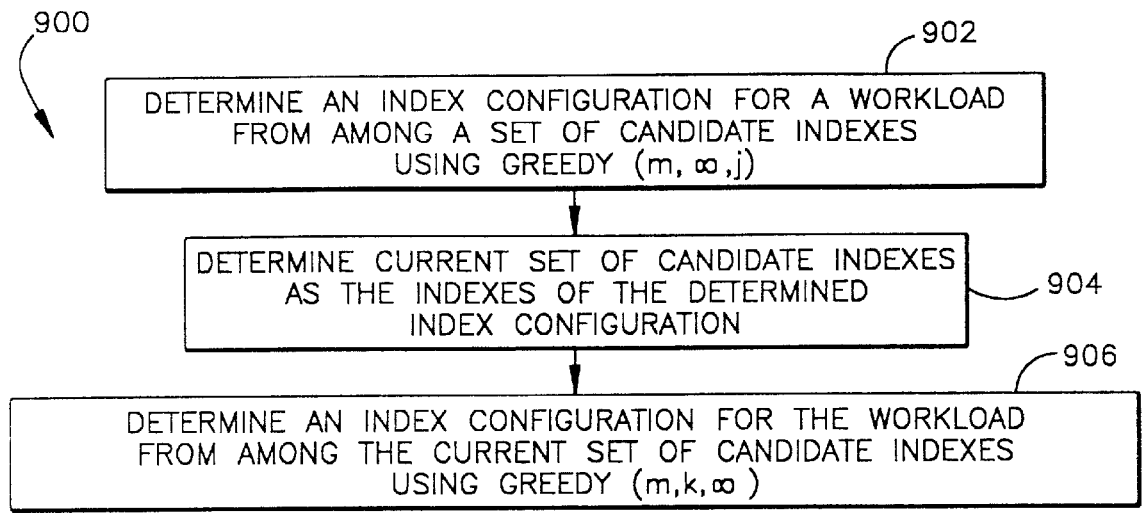
FIG. 9 illustrates, for one embodiment, a flow diagram for determining an index configuration for a workload of queries in accordance two tiers of the flow diagram of FIG. 8.

Index configuration enumeration tool 340 for one embodiment determines an index configuration for workload 304 from among a set of candidate indexes in accordance with a two-tier search algorithm of a flow diagram 900 of FIG. 9.

For the first tier, index configuration enumeration tool 340 for step 902 of FIG. 9 determines an index configuration for workload 304 from a set of candidate indexes in accordance with the greedy enumeration algorithm Greedy(m, k=∞, j) of FIG. 8. Index configuration enumeration tool 340 attempts to reduce the cost in time and memory in reconciling among the set of candidate indexes that were derived from multiple queries of workload 304 in accordance with an n-join atomic index configuration pruning technique, where n=j−1, by restricting the set of atomic index configurations for step 802 of FIG. 8 to those comprising indexes on at most j tables. As the value of k is ∞ for the first tier, index configuration enumeration tool 340 does not limit the number of indexes of the index configuration determined for step 812 of FIG. 8.

For one embodiment, index configuration enumeration tool 340 performs the greedy enumeration algorithm with the value of m as 2 and the value of j as 2. With j=2, index configuration enumeration tool 340 performs a single-join atomic index configuration enumeration technique.

The n-join configuration enumeration pruning technique for one embodiment also considers whether indexes are clustered or non-clustered in determining candidate indexes for step 812. Each candidate index may be marked as clustered or non-clustered. The set of indexes for step 812 may comprise multiple clustered indexes over the same table or a non-clustered index as well as a clustered index on the same column.

Index configuration enumeration tool 340 determines for step 904 of FIG. 9 a current set of candidate indexes for the second tier of flow diagram 900 as the indexes of the index configuration determined for step 812 of FIG. 8 for the first tier.

For the second tier, index configuration enumeration tool 340 for step 906 of FIG. 9 determines an index configuration for workload 304 from the current set of candidate indexes as determined for step 904 in accordance with the greedy enumeration algorithm Greedy(m, k, j=∞) of FIG. 8. As the value of j is ∞, index configuration enumeration tool 340 for the second tier considers for step 802 of FIG. 8 all multitable atomic index configurations for workload 340 in evaluating costs for current candidate index configurations. Index selection tool 300 may use the index configuration determined for step 812 as selected index configuration 302.

For one embodiment, index configuration enumeration tool 340 performs the greedy enumeration algorithm with the value of m as 2 and any suitable value of k.

Index configuration enumeration tool 340 for one embodiment for the second tier also ensures the index configuration determined for step 906 of FIG. 6 comprises at most one clustered index for every table of database 210.

Use of the greedy enumeration algorithm to determine an index configuration allows index configuration enumeration tool 340 and cost evaluation tool 320 for one embodiment to interleave the evaluation of atomic index configurations with the selection of indexes for steps 806, 808, and 810 of FIG. 8. Atomic index configurations may therefore be evaluated for step 802 only as needed. That is, index configuration enumeration tool 340 and cost evaluation tool 320 may invoke query optimizer 240 on-demand.

Index configuration enumeration tool 340 for another embodiment determines an index configuration for workload 304 from a set of candidate indexes in accordance with an index configuration enumeration branch-and-bound algorithm. For the branch-and-bound algorithm, index configuration enumeration tool 304 for one embodiment uses the greedy enumeration algorithm Greedy(m,k,j) with a relatively low value of m to determine an initial index configuration for workload 304. Index configuration enumeration tool 340 then enumerates index configurations exhaustively with the constraint that the cost of each partial or subset index configuration must be within a predetermined factor of the cost of workload 304 for a corresponding partial or subset index configuration of the index configuration determined using Greedy(m,k,j). The branch-and-bound algorithm for one embodiment is illustrated as flow diagram 1000 in FIG. 10.

Figure 10:
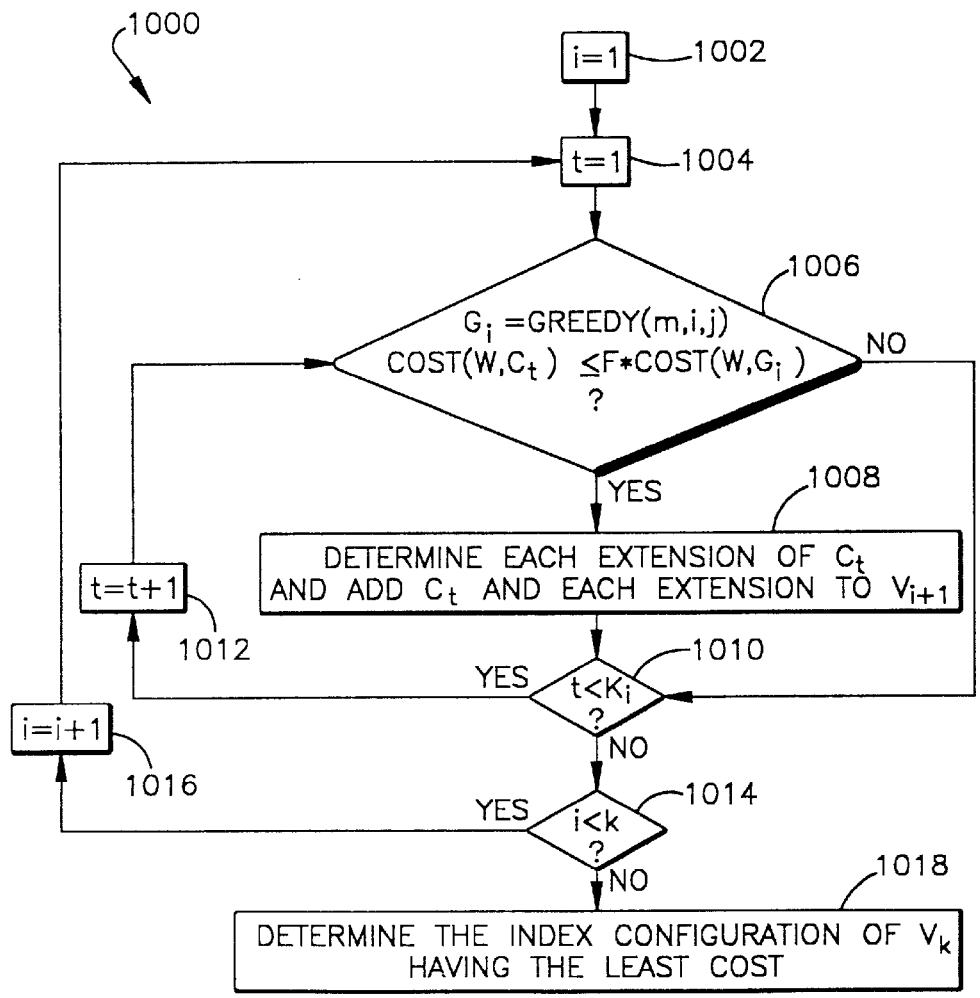
FIG. 10 illustrates, for one embodiment, a flow diagram for determining an index configuration for a workload of queries in accordance with an index (configuration enumeration branch-and-bound algorithm.

For the algorithm of FIG. 10, $V_i$ denotes a set of index configurations $\{C_1, \ldots, C_{Ki}\}$ each containing at most i indexes of the set of candidate indexes to be evaluated for the algorithm.

For step 1002 of FIG. 10, index configuration enumeration tool 340 initializes a variable i to 1 for use in identifying the size of the candidate index configuration evaluated at any stage in the algorithm. Index configuration enumeration tool 340 for step 1004 initializes a variable t to 1 for use in identifying an index configuration $C_t$ of a current set $V_i$ under evaluation.

For step 1006 of FIG. 10, index configuration enumeration tool 340 determines an index configuration $G_i$ as the index configuration selected from all candidate indexes in accordance with the greedy enumeration algorithm Greedy (m,i,j) and determines whether the cost of workload 304 for the index configuration $C_t$ of $V_i$, or Cost(W,$C_t$), is within a predetermined factor F of the cost of workload 304 for the index configuration $G_i$, or Cost(W,$G_t$). If so, index configuration enumeration tool 340 determines for step 1008 each extension of the index configuration $C_t$ and adds the index configuration $C_t$ and each extension of $C_t$ to the set of index configurations denoted by $V_{i+1}$. Index configuration enumeration tool 340 determines an extension of the index configuration $C_t$ by adding one of the candidate indexes not already a member of the index configuration $C_t$ to the index configuration $C_t$. Index configuration enumeration tool 340 then determines for step 1010 whether all $K_i$ index configurations $C_t$ of the set $V_i$ have been evaluated and, if not, increments the variable t for step 1012 to evaluate another index configuration $C_t$ of the set $V_i$ for step 1006. If index configuration enumeration tool 340 determines for step 1006 that the cost of workload 304 for the index configuration $C_t$ of $V_i$ is not within a predetermined percentage of the cost of workload 304 for the index configuration $G_i$, index configuration enumeration tool 340 proceeds directly to step 1010.

Index configuration enumeration tool 340 repeats steps 1006, 1008, 1010, and 1012 until index configuration enumeration tool 340 determines for step 1010 that all $K_i$ index configurations $C_t$ of the set $V_i$ have been evaluated for step 1006. Index configuration enumeration tool 340 then determines for step 1014 whether all index configurations $C_t$ of all k index configuration sets $V_i$ have been evaluated and, if not, increments the variable i for step 1016 to evaluate index configurations $C_t$ of the next set $V_i$. Index configuration enumeration tool 340 therefore iteratively evaluates sets of candidate index configurations in order of increasing size.

If index configuration enumeration tool 340 determines for step 1014 that all index configurations $C_t$ of all k index configuration sets $V_i$ have been evaluated, index configuration enumeration tool 340 determines for step 1018 an index configuration for workload 304 as the index configuration $C_t$ of the set $V_k$ having the least total cost for workload 304.

The predetermined factor F for step 1006 may have any suitable value and for one embodiment is 1.3. The predetermined factor F for one embodiment may be determined by a user of index selection tool 300.

Multi-Column Index Configuration Selection for a Workload and Database

Given the queries of workload 304, index selection tool 300 for one embodiment determines index configuration 302 from among a set of indexes comprising multi-column indexes.

The number of indexes and therefore index configurations over database 210 can be very large and can incur a significant cost in time and memory in searching the index configurations to select index configuration 302. This cost is further compounded by the presence of multi-column indexes as the number of indexes may possibly comprise k! multi-column indexes for a given set of k columns and therefore require an increased number of invocations of query optimizer 240 to determine costs for index configurations.

Index selection tool 300 for one embodiment attempts to reduce the cost attendant to selecting index configuration 302 from a set of indexes comprising multi-column indexes for the queries of workload 304 by iteratively determining for workload 304 index configurations comprising indexes over one additional column at a time. Index selection tool 300 for one embodiment determines index configuration 302 from a set of indexes in accordance with a flow diagram 1100 illustrated in FIG. 11.

Figure 11:
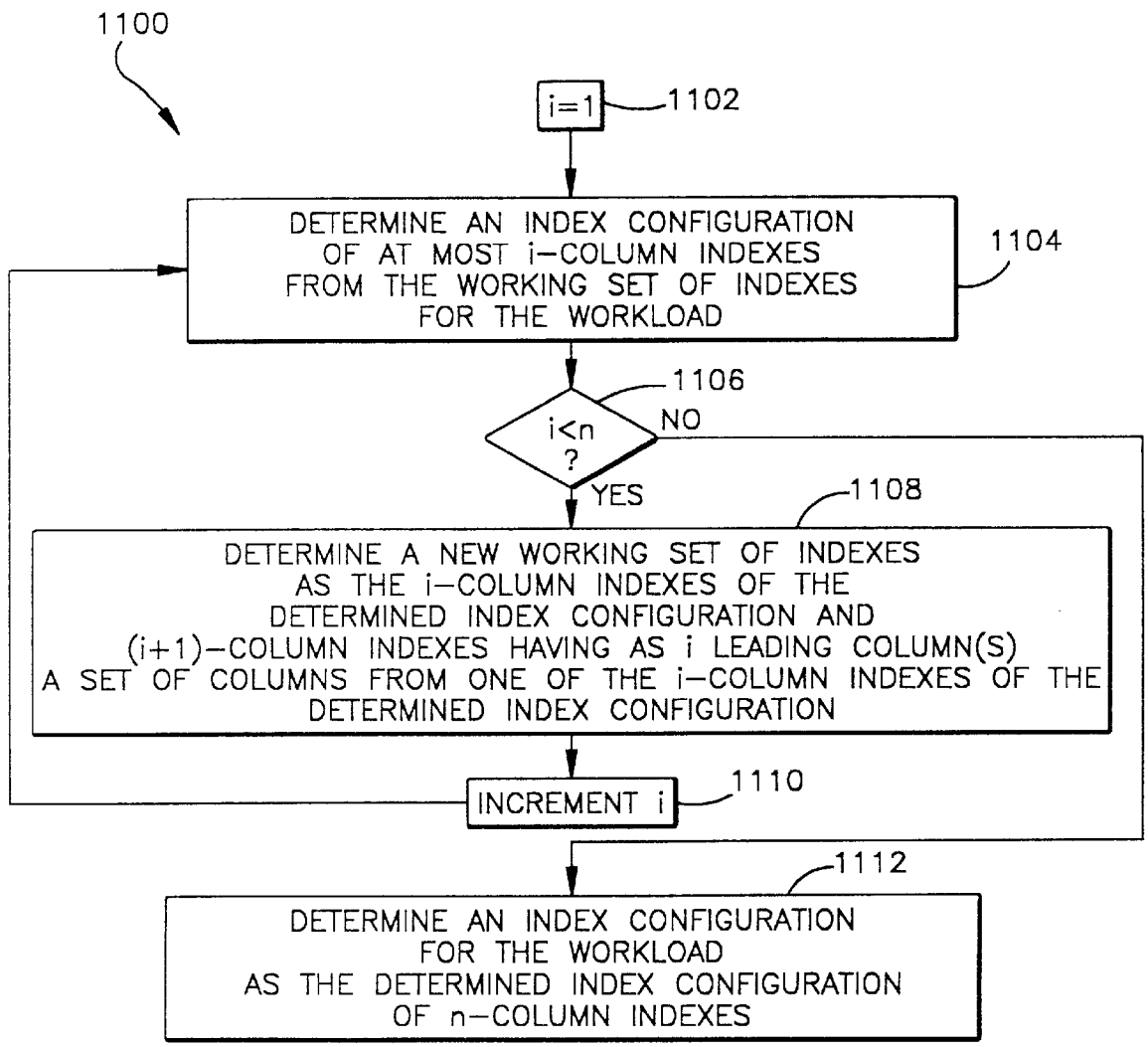
FIG. 11 illustrates, for one embodiment, a flow diagram for determining an index configuration of multi-column indexes for a workload of queries.

For step 1102 of FIG. 11, index selection tool 300 initializes a variable i to 1 for use in identifying the maximum number of columns for indexes of index configurations evaluated for each iteration.

For step 1104 of FIG. 11, index selection tool 300 determines an index configuration of at most i-column indexes from among a working set of indexes for workload 304. For an initial iteration, the working set of indexes is an initial set of single-column indexes determined for workload 304.

Index selection tool 300 for step 1104 for one embodiment determines the index configuration of at most i-column indexes for workload 304 using index configuration enumeration tool 340.

For step 1106 of FIG. 11, index selection tool 300 determines whether a predetermined number n of iterations have been completed to determine index configuration 302 of at most n-column indexes. The predetermined number n corresponds to the maximum width in number of columns for the indexes of index configuration 302.

If index selection tool 300 determines i is less than n for step 1106, index selection tool 300 for step 1108 of FIG. 11 determines a new working set of indexes as comprising the i-column indexes of the index configuration determined for step 1104 and comprising from among the initial set of indexes any (i+1)-column indexes having as i leading column(s) a set of columns from one of the i-column indexes of the index configuration selected for step 1104. For one embodiment, the trailing column of each (i+1)-column index determined for the new working set of indexes for step 1106 of each iteration may or may not be one of the columns of the indexes selected for step 1104 of that iteration. Index selection tool 300 for one embodiment uses multi-column index generation tool 350 of FIG. 3 to determine the new working set of indexes for step 1108.

As one example for an index configuration S of one-column indexes as determined for step 1104, the new working set of indexes comprises the one-column indexes of index configuration S and any two-column index M(a,b) over column pair (a,b) such that the leading column a of each two-column index M(a,b) is one of the one-column indexes of index configuration S and such that each two-column index M(a,b) is a member of the initial set of indexes. The trailing column b may or may not be one of the columns of the indexes for index configuration S.

For step 1110 of FIG. 11, index selection tool 300 increments i by one and proceeds to step 1104 to determine an index configuration of i-column indexes for workload 304 from among the new working set of indexes as determined for step 1108. Index selection tool 300 iteratively repeats steps 1104 through steps 1110 until index selection tool 300 determines for step 1106 that i=n. Index selection tool 300 for step 1112 determines index configuration 302 for workload 304 as the index configuration of n-column indexes determined for step 1104.

The implementation of determining index configuration 302 from a set of indexes comprising multi-column indexes for flow diagram 1100 is therefore bootstrapped onto the implementation of determining an index configuration from a given set of indexes. Index selection tool 300 reduces the number of indexes to be evaluated in determining index configuration 302 by iteratively determining a new working set of indexes for step 1108 of each iteration based on the index configuration determined for step 1104 of each iteration. Index selection tool 300 therefore helps reduce the number of invocations of query optimizer 240 to determine index configuration 302.

Because the trailing column of each (i+1)-column index determined for the new working set of indexes for step 1108 of each iteration may or may not be one of the columns of the indexes selected for step 1104 of that iteration, index selection tool 300 emphasizes the significance of the interaction between columns of a multi-column index in determining the significance of the multi-column index. As one example, a trailing column b of a multi-column index M(a,b) may not be one of the columns of the indexes selected for step 1104 but the interaction between column b and the leading column a that is one of the columns of the indexes selected for step 1104 may increase the significance of multi-column index M(a,b) as an index.

For another embodiment, index selection tool 300 determines the trailing column of each (i+1)-column index determined for the new working set of indexes for step 1108 of each iteration to be one of the columns of the indexes selected for step 1104 of that iteration. That is, index selection tool 300 determines the new working set of indexes for step 1108 of each iteration such that all columns of each index is in the indexable column set for the index configuration selected for step 1104. Index selection tool 300 for this embodiment emphasizes the significance of all columns of a multi-column index in determining the significance of the multi-column index.

With multi-column indexes, index selection tool 300 may also consider indexes that help database server 220 answer queries using only indexes without having to access any tables of database 210. That is, index selection tool 300 may also consider indexes that help index-only access. To consider indexes that help index-only access, index selection tool 300 for one embodiment determines the trailing column of each (i+1)-column index determined for the new working set of indexes for step 1108 of each iteration to be one of the columns that is part of a projection list in workload 304. Index selection tool 300 for another embodiment determines the trailing column of each (i+1)-column index determined for the new working set of indexes for step 1108 of each iteration to be a column from the required column set for any query of workload 304 with respect to the table of database 210 having the i leading columns of the (i+1)column index.

Index selection tool 300 may also consider indexes that help index-only access by determining for step 1108 the new working set of indexes as also comprising any (i+1)-column index on the required set of columns for any query of workload 304 with respect to a table of database 210. For each such (i+1)-column index, the required set of columns for a query with respect to a table may be ordered in any suitable manner. For one embodiment, all columns of a table on which the query has one or more conditions precede the remaining columns of the required set of columns for the query with respect to that table.

Index selection tool 300 for one embodiment may also attempt to reduce the number of invocations of query optimizer 240 by cost evaluation tool 320 in evaluating atomic index configurations comprising multi-column indexes in accordance with the relevant index set optimization technique.

Because database server 220 may reduce the cost of executing queries with conditions on columns a and b and with conditions on column a only using a multi-column index M(a,b) on two columns a and b, cost evaluation tool 320 for one embodiment may determine the cost of a query Q with a condition on column a for the multi-column index M(a,b) as the cost of the query Q for only a single-column index on column a. Using the multi-column index M(a,b) may not, however, reduce the cost of executing a query with a condition on column b only. Cost evaluation tool 320 may also determine the cost of a query Q with conditions on both columns a and b for the multi-column index M(a,b) as the cost of the query Q for the multi-column index M(b,a) because database server 220 may use either multi-column index M(a,b) or multi-column index M(b,a) to help reduce the cost in executing the query Q.

For a multi-column index M(a,b) and an arbitrary index configuration J, cost evaluation tool 320 for one embodiment may determine a cost Cost(Q, J∪{M(a,b)}) of a query Q for the index configuration J∪{M(a,b)} as:

(1) the cost Cost(Q, J∪{ }) of the query Q for the index configuration J if the column a is absent from the indexable column set of the query Q; or (2) the cost Cost(Q, J∪{a}) of the query Q for the index configuration J∪{a} if the column a is present in and the column b is absent from the indexable column set of the query Q; or (3) the cost Cost(Q, J∪{M(b,a)}) of the query Q for the index configuration J∪{M(b,a)} if both columns a and b are present in the indexable column set of the query Q.

Cost evaluation tool 320 may extend determining costs in this manner to multi-column indexes with widths greater than two columns.

Exemplary Embodiment for Index Selection Tool

Referring to FIG. 3, index selection tool 300 for one embodiment determines the set of indexable columns for the queries of workload 304 and generates a set of indexes for candidate index selection tool 330 as the single-column indexes on each indexable column of workload 304. Using this set of candidate indexes, candidate index selection tool 330 performs the query-specific-best-configuration algorithm in accordance with flow diagram 700 of FIG. 7 to determine a set of candidate indexes 338 of FIG. 6. Index configuration enumeration tool 340 then determines a suitable index configuration of single-column indexes for workload 304 from among the set of candidate indexes 338 in accordance with the greedy enumeration algorithm or Greedy(m,k,j) of flow diagram 800 of FIG. 8. For one embodiment, m=2, j=2, and k is determined by a user of index selection tool 300. Based on the determined set of single-column indexes, multi-column index generation tool 350 determines a set of multi-column indexes where the leading column of each multi-column index is in the indexable column set for the determined set of single-column indexes. Using the determined set of single-column indexes and the determined set of multi-column indexes as admissible indexes, indexes, election tool 300 iteratively repeats this process in accordance with flow diagram 1100 of FIG. 11.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for selecting an index configuration from a set of indexes based on a workload of queries to be executed against a database, the method comprising the steps of:

(a) selecting from the set of indexes an index configuration comprising indexes each on at most a predetermined number i column(s) based on the workload of queries; and (b) repeatedly selecting from the set of indexes an index configuration comprising indexes each on at most one additional column based on a previously selected index configuration and based on the workload of queries until an index configuration of indexes each on at most a predetermined number n columns is selected.

2. The method of claim 1, wherein the selecting step (b) comprises the steps of:

(i) generating a set of multi-column indexes each on one additional column based on the previously selected index configuration, and (ii) selecting the index configuration comprising indexes each on at most one additional column from the indexes of the previously selected index configuration and from the set of multi-column indexes generated for step (b)(i) based on the workload of queries.

3. The method of claim 2, wherein the generating step (b)(i) comprises the step of generating the set of multi-column indexes such that each multi-column index of the generated set has as one or more leading columns the column(s) from one of the indexes of the previously selected index configuration.

4. The method of claim 3, wherein the generating step (b)(i) comprises the step of generating the set of multi-column indexes such that each multi-column index of the generated set has as a trailing column an indexable column for the workload.

5. The method of claim 3, wherein the generating step (b)(i) comprises the step of generating the set of multi-column indexes such that each multi-column index of the generated set has as a trailing column one of the column(s) from one of the indexes of the previously selected index configuration.

6. The method of claim 3, wherein the generating step (b)(i) comprises the step of generating the set of multi-column indexes such that each multi-column index of the generated set has as a trailing column a part of a projection list in the workload.

7. The method of claim 3, wherein the generating step (b)(i) comprises the step of generating the set of multi-column indexes such that each multi-column index of the generated set has as a trailing column a required column for a query of the workload with respect to a table of the database having the leading column(s) of the multi-column index.

8. The method of claim 1, wherein the selecting step (b) selects from the set of indexes an index configuration also comprising one or more indexes each on at most one additional column based on one or more required columns for a query of the workload with respect to a table of the database.

9. The method of claim 1, wherein the selecting step (a) comprises the step of using an index configuration enumeration tool to select the index configuration comprising indexes each on at most the predetermined number i column (s), and wherein the selecting step (b) comprises the step of using the same index configuration enumeration tool to select the index configuration comprising indexes each on at most one additional column.

10. The method of claim 1, wherein the selecting step (a) comprises the steps of:

(i) determining estimated costs to execute queries of the workload for index configurations comprising indexes each on at most the predetermined number i column(s) from the set of indexes, and (ii) selecting one of the index configurations comprising indexes each on at most the predetermined number i column(s) based on the determined estimated costs.

11. The method of claim 1, wherein the selecting step (a) comprises the steps of:

(i) determining a set of candidate indexes from the set of indexes, and (ii) selecting the index configuration comprising indexes each on at most the predetermined number i column(s) from the set of candidate indexes based on the workload of queries.

12. The method of claim 2, wherein the selecting step (b)(ii) comprises the steps of:

(A) determining estimated costs to execute queries of the workload for index configurations comprising indexes from the previously selected index configuration and from the set of multi-column indexes generated for step (b)(i), and (B) selecting one of the index configurations comprising indexes from the previously selected index configuration and from the set of multi-column indexes generated for step (b)(i) based on the determined estimated costs.

13. The method of claim 2, wherein the selecting step (b)(ii) comprises the steps of:

(A) determining a set of candidate indexes from the indexes of the previously selected index configuration and from the set of multi-column indexes generated for step (b)(i), and (B) selecting the index configuration comprising indexes each on at most one additional column from the set of candidate indexes based on the workload of queries.

14. The method of claim 1, comprising the step of determining an index configuration for use by a database server to execute queries of the workload against the database as the selected index configuration of indexes each on at most the predetermined number n columns.

15. The method of claim 1, wherein the predetermined number i is one.

16. A computer readable medium having computer-executable instructions for performing the steps of claim 1.

17. A computer readable medium having computer-executable instructions for performing the steps of claim 2.

18. A computer readable medium having computer-executable instructions for performing the steps of claim 9.

19. A method for selecting an index configuration from an initial working set of indexes based on a workload of queries to be executed against a database, the method comprising the steps of:

(a) selecting from the working set of indexes an index configuration comprising indexes each on at most i column(s) based on the workload of queries;

(b) determining a new working set of indexes as comprising the indexes of the index configuration selected for step (a) and comprising any (i+1)-column indexes having as one or more leading columns the column(s) from one of the indexes of the index configuration selected for step (a);

(c) incrementing i; and (d) repeating steps (a), (b), and (c) until an index configuration of indexes each on at most a predetermined number n columns is selected for step (a).

20. The method of claim 19, wherein each (i+1)-column index of the new working set of indexes determined for step (b) has as a trailing column an indexable column for the workload.

21. The method of claim 19, wherein each (i+1)-column index of the new working set of indexes determined for step (b) has as a trailing column one of the column(s) from one of the indexes of the index configuration selected for step (a).

22. The method of claim 19, wherein each (i+1)-column index of the new working set of indexes determined for step (b) has as a trailing column a part of a projection list in the workload.

23. The method of claim 19, wherein each (i+1)-column index of the new working set of indexes determined for step (b) has as a trailing column a required column for a query of the workload with respect to a table of the database having the leading column(s) of the (i+1)-column index.

24. The method of claim 19, wherein the determining step (b) determines the new working set of indexes as also comprising any (i+1)-column indexes each on one or more required columns for a query of the workload with respect to a table of the database.

25. The method of claim 19, wherein the selecting step (a) comprises the steps of:

(i) determining estimated costs to execute queries of the workload for index configurations comprising indexes each on at most i column(s) from the working set of indexes, and (ii) selecting one of the index configurations comprising indexes each on at most i column(s) based on the determined estimated costs.

26. The method of claim 19, wherein the selecting step (a) comprises the steps of:

(i) determining a set of candidate indexes from the working set of indexes, and (ii) selecting the index configuration comprising indexes each on at most i column(s) from the set of candidate indexes based on the workload of queries.

27. The method of claim 19, comprising the step of determining an index configuration for use by a database server to execute queries of the workload against the database as the selected index configuration of indexes each on at most the predetermined number n columns.

28. The method of claim 19, wherein i is initially one.

29. A computer readable medium having computer-executable instructions for performing the steps of claim 19.

* * * * *

UNITED STATES PATENT AND TRADEMARK OFFICE
CERTIFICATE OF CORRECTION

PATENT NO.: 5,913,206

DATED: June 15, 1999

INVENTOR(S): Surajit Chaudhuri and Vivek Narasayya

It is certified that error appears in the above-identified patent and that said Letters Patent is hereby corrected as shown below:

In column 1, line 54, "is small" should read --as small--.
In column 4, line 34, "(configuration" should read --configuration--.
In column 4, line 58, "indexe" should read --indexes--.
In column 5, line 3, "dita" should read --data--.
In column 6, line 31, "System" should read --system--.
In column 7, line 3, "example" should read --example.--.
In column 7, line 55, "indexes;" should read --indexes--.
In column 8, line 11, "(candidate" should read --candidate--.
In column 9, line 25, "What-If$_{13}$ Index" should read --What-If_Index--.
In column 9, line 52, "rages" should read --pages--.
In column 10, line 61, "R. a" should read --R.a--.
In column 11, line 10, "tenktup1.unique 1" should read --tenktup1.unique1--.
In column 11, line 17, "s" should read --is--.
In column 12, line 12, "Determined" should read --determined--.
In column 12, line 26, "he" should read --the--.
In column 13, line 22, "onektup unique1" should read --onektup.unique1--.
In column 14, line 50, "configurations;" should read --configurations--.

UNITED STATES PATENT AND TRADEMARK OFFICE
CERTIFICATE OF CORRECTION

PATENT NO.: 5,913,206

DATED: June 15, 1999

INVENTOR(S): Surajit Chaudhuri and Vivek Narasayya

It is certified that error appears in the above-identified patent and that said Letters Patent is hereby corrected as shown below:

In column 16, line 27, "query $Q_2$" should read --the query $Q_2$--.
In column 16, line 28, "{I1, I2}" should read --$\{I_1, I_2\}$--.
In column 16, line 49, "$\{I_1\}$" should read --$\{I_i\}$--.
In column 16, line 51, "$\{I_1\}$" should read --$\{I_i\}$--.
In column 19, line 10, "multijoin" should read --multi-join--.
In column 26, line 13, "(i+1)column" should read --(i+1)-column--.
In column 27, line 21, "indexes, election" should read --index selection--.

Signed and Sealed this

Sixteenth Day of November, 1999

Attest:

Q. TODD DICKINSON

Attesting Officer

Acting Commissioner of Patents and Trademarks